(12) United States Patent
Yao

(10) Patent No.: US 12,545,771 B2
(45) Date of Patent: Feb. 10, 2026

(54) HYDROPHOBIC BIOPLASTIC FILM FOR MULTIPLE-USE AND METHOD FOR MANUFACTURING THE SAME

(71) Applicant: Henry Yao, Sunnyvale, CA (US)

(72) Inventor: Henry Yao, Sunnyvale, CA (US)

( * ) Notice: Subject to any disclaimer, the term of this patent is extended or adjusted under 35 U.S.C. 154(b) by 281 days.

(21) Appl. No.: 18/131,038

(22) Filed: Apr. 5, 2023

(65) Prior Publication Data

US 2024/0336754 A1    Oct. 10, 2024

(51) Int. Cl.
| | |
|---|---|
| C08J 7/06 | (2006.01) |
| C08J 5/18 | (2006.01) |
| C08L 3/02 | (2006.01) |
| C08L 5/08 | (2006.01) |
| C09D 1/00 | (2006.01) |
| C09D 5/00 | (2006.01) |
| C09D 7/20 | (2018.01) |
| C09D 7/40 | (2018.01) |
| C09D 7/45 | (2018.01) |
| C09D 7/63 | (2018.01) |

(52) U.S. Cl.
CPC . *C08J 7/06* (2013.01); *C08J 5/18* (2013.01); *C08L 3/02* (2013.01); *C08L 5/08* (2013.01); *C09D 1/00* (2013.01); *C09D 5/00* (2013.01); *C09D 7/20* (2018.01); *C09D 7/45* (2018.01); *C09D 7/63* (2018.01); *C09D 7/67* (2018.01); *C08J 2303/02* (2013.01); *C08J 2305/08* (2013.01); *C08J 2403/02* (2013.01); *C08J 2405/08* (2013.01); *C08L 2203/16* (2013.01)

(58) Field of Classification Search
CPC ... C08J 7/06; C08J 5/18; C08J 2303/02; C08J 2305/08; C08J 2403/02; C08J 2405/08; C09D 7/20; C09D 7/67; C09D 7/45; C09D 7/63; C09D 1/00; C09D 1/50; C09D 5/00; C08L 3/02; C08L 5/08; C08L 2203/16
See application file for complete search history.

(56) References Cited

PUBLICATIONS

Inayatul Mutmainna et al 2019 J. Phys.: Conf. Ser. 1317 012053 "Synthesis composite starch-chitosan as biodegradable plastic for food packaging" (Year: 2019).*
Saleh et al. (Chitosan-functionalized silica nanoparticles as a multifunctional coating for improved water repellency, antimicrobial activity and mechanical strength of degradable bioplastics Cellulose 2022 29:7691-7701 (Year: 2022).*
Yu et al. "Preparation of a superhydrophilic SiOs nanoparticles coated chitosan-sodium phytate film by a simple ethanol soaking process" Carbohydrate Polymers 271 (2021) 118422. (Year: 2021).*
Gadhave et al., "Starch Based Bio-Plastics: the Future of Sustainable Packaging"; Open Journal of Polymer Chemistry, May 2018, vol. 8, pp. 21-33. https://www.scirp.org/journal/paperinformation. aspx?paperid=84926.

(Continued)

*Primary Examiner* — Robert S Walters, Jr.

(57) ABSTRACT

A hydrophobic bioplastic film and a method of manufacturing the hydrophobic bioplastic film for multiple-use are provided. The hydrophobic bioplastic film provides unique food preservation as an environment-friendly alternative to other plastics. The hydrophobic bioplastic film includes a chitosan-based bioplastic film that is coated with a plurality of hydrophobic nanoparticles.

6 Claims, 21 Drawing Sheets

(56) References Cited

PUBLICATIONS

National Geographic, "Plastic pollution: Images of a global problem", May 2018. https://www.bbc.com/news/science-environment-44215882.
ScienceDirect, "Polylactide", https://www.sciencedirect.com/topics/materials-science/polylactide.
Axel Barrett, "The Problems with PLA", Mar. 2020. https://bioplasticsnews.com/2020/03/14/pla-problems/#:~:text=PLA%20releases%20fewer%20GHGs%20from,%2C%20non%2Dgenetically%20modified%20crops.
Jabeen et al., "Bioplastics and food packaging: a review", Cogent Food & Agriculture, Dec. 2015. https://doi.org/10.1080/23311932.2015.1117749.
Marichelvam et al., "Corn and Rice Starch-Based Bio-Plastics as Alternative Packaging Materials", MDPI, Apr. 2019. https://www.mdpi.com/2079-6439/7/4/32/htm.
Iber et al., "A Review of Various Sources of Chitin and Chitosan in Nature", Engormix, Jan. 2022. https://en.engormix.com/feed-machinery/articles/review-various-sources-chitin-t48446.htm.
Jiménez-Gómez et al., "Chitosan; a Natural Biopolymer with a Wide and Varied Range of Applications", NCBI, Sep. 2020. https://www.ncbi.nlm.nih.gov/pmc/articles/PMC7504732/.
Ouattara et al., "Inhibition of Surface Spoilage Bacteria in Processed Meats by Application of Antimicrobial Films Prepared with Chitosan", International Journal of Food Microbiology 62.1-2, Jul. 2000, pp. 139-148. https://www.academia.edu/42084885Inhibition_of_surface_spoilage_bacteria_in_processed_meats_by_application_of_antimicrobial_films_prepared_with_chitosan_a_b_a_a_c?auto=citations&from=cover_page.
Fernandez-Saiz, "Optimization of the biocide properties of chitosan for its application in the design of active films of interest in the food area", ScienceDirect, May 2009. https://www.sciencedirect.com/science/article/abs/pii/S0268005X0800132X.
Raafat et al., "Chitosan and its antimicrobial potential—a critical literature survey", Microbial Biotechnology (2009) 2(2), pp. 186-201.
Atay et al., "Antibacterial Activity of Chitosan-Based Systems", NCBI, May 2020, pp. 457-489. https://www.ncbi.nlm.nih.gov/pmc/articles/PMC7114974/#:~:text=Chitosan%20is%20a%20natural%20antimicrobial,wall%20of%20filamentous%20fungus%2C%20R.
Susilawati et al., "Characterization of Bioplastic Packaging from Tapioca Flour Modified with the Addition of Chitosan and Fish Bone Gelatin", World Scientific News, 2019, pp. 85-98. https://bibliotekanauki.pl/articles/1065256.
Cao et al., "Preparation and characterization of catechol-grafted chitosan/gelatin/modified chitosan-AgNP blend films", ScienceDirecct, Nov. 2020. https://www.sciencedirect.com/science/article/abs/pii/S0144861720308171.
Oever et al., "Bio-based and biodegradable plastics—Facts and Figures", Wageningen Food & Biobased Research No. 1722, Apr. 2017.
Recycle Coach, "7+ Revealing Plastic Waste Statistics (2021)" Recycle Coach, Sep. 2021, https://recyclecoach.com/resources/7-revealing-plastic-waste-statistics-2021/.
Qdemat et al., "Self assembled monolayer of silica nanoparticles with improved order by drop casting", RSC Adv., 2020, 10, Apr. 2020, pp. 18339-18347.
Cao et al., "Dispersing hydrophilic nanoparticles in nonaqueous solvents with superior long-term stability", Royal Society of Chemistry, May 2017. https://pubs.rsc.org/en/content/articlehtml/2017/ra/c7ra03472e.
Trowsdale et al., "Seven charts that explain the plastic pollution problem", BBC, Dec. 2017. https://www.bbc.com/news/science-environment-42264788.
Tsydenova et al., "6 reasons to blame plastic pollution for climate change", End Poverty in South Asia, Nov. 2021.
Henry Yao, "From Food Waste to Food Guard: Creating a Novel Chitosan Bioplastic With Nanoparticle Coating and Its Unique Effect on Water Resistance and Food Preservation", PowerPoint presentation, Sep. 2022.
Henry Yao, "From Food Waste to Food Guard: Creating a Novel Chitosan Bioplastic With Nanoparticle Coating and Its Unique Effect on Water Resistance and Food Preservation", Research Paper, Sep. 2022.

\* cited by examiner

HYDROPHOBIC BIOPLASTIC FILM FOR MULTIPLE-USE AND METHOD FOR MANUFACTURING THE SAME

FIELD

The present disclosure generally relates to bioplastic films and, more specifically, to a hydrophobic bioplastic film for multiple uses. In particular, the present disclosure seeks to improve the longevity of bioplastic films by providing the hydrophobic bioplastic film for multiple uses.

BACKGROUND

Petroleum-based plastics have been prevalently and traditionally used in various facets of our daily lives, for example, plastic grocery bags, plastic or liquid containers, plastic wraps for packaging and storage, food preservation plastic products, etc. While petroleum-based plastics provide excellent water resistance and low manufacturing cost, petroleum-based plastics also tremendously contribute to the world-wide pollution problem. Thus, the potential market for an alternative to the petroleum-based plastics that is also environmentally friendly while applicable for multiple uses is enormous. One such alternative is bioplastics with biopolymers as the base material, for example, polylactic acid filament (PLA), cellulose, starch, etc. However, many studies have shown that many biopolymer plastics or bioplastics alone may not be environmentally friendly or suitable for multiple uses. For example, some bioplastics are susceptible to forming hazardous chemicals due to moisture and temperature differences, while some bioplastics do not provide sufficient mechanical strength, and some bioplastics have low biodegradability. Further studies will need to be conducted on bioplastics to further improve in terms of tensile strength and water resistance. The present disclosure introduces chitosan as the biopolymer-based material for bioplastics, due to the innate antimicrobial and antifungal properties, low cost, highly renewability, biodegradability, environmentally friendly, and the enormously abundant resources of chitosan, that is coated with hydrophobic nanoparticles for high water resistance.

SUMMARY

The present disclosure generally relates to hydrophobic bioplastic film for multiple-use and a manufacturing method thereof.

In accordance with one aspect of the present disclosure, a method of manufacturing a hydrophobic bioplastic film for multiple-use is provided. The method may include forming a bioplastic film having chitosan and coating the bioplastic film with a plurality of hydrophobic nanoparticles.

In some implementations, forming the bioplastic film may include forming a polymer mixture by mixing a first amount of chitosan powder, a second amount of starch, and a third amount of water, heating the polymer mixture, introducing a fourth amount of glycerin and a fifth amount of acetic acid into the polymer mixture and further mixing the polymer mixture, removing the further mixed polymer mixture from heating, distributing the further mixed polymer mixture substantially evenly, and drying the substantially evenly distributed polymer mixture to form the bioplastic film.

In some implementations, the first amount may be from 12 to 14 grams, the second amount may be from 12 to 14 grams, the third amount may be from 180 to 200 milliliters, the fourth amount may be 10 milliliters, and the fifth amount may be 10 milliliters.

In some implementations, the polymer mixture may be heated at a temperature from 65 to 75° C., inclusive.

In some implementations, coating the bioplastic film may include vertically submerging the bioplastic film into a nanoparticle dispersion that includes the plurality of hydrophobic nanoparticles, directing the plurality of hydrophobic nanoparticles of the nanoparticle dispersion toward the submerged bioplastic film, and removing the bioplastic film, coated with an aggregation of the plurality of hydrophobic nanoparticles, from the nanoparticle dispersion to form the hydrophobic bioplastic film.

In some implementations, the nanoparticle dispersion may include mixing 100 micrograms of nanoparticle powder into isopropanol, and distributing the nanoparticle powder substantially evenly in the nanoparticle dispersion.

In some implementations, the isopropanol and the nanoparticle powder may be mixed at a ratio of 1 milliliter of the isopropanol to 100 micrograms of the nanoparticle powder.

In some implementations, in mixing the nanoparticle dispersion, the isopropanol and the nanoparticle powder may be mixed for a continuous period of 20 minutes.

In some implementations, the nanoparticle powder may include the plurality of hydrophobic nanoparticles. The plurality of hydrophobic nanoparticles ma include at least silicon dioxide particles. The silicon dioxide particles may have an average particle size of 10 nanometers to 20 nanometers, inclusive.

In some implementations, in mixing the nanoparticle dispersion, the nanoparticle dispersion may be further mixed with a surfactant and acetone. The surfactant may include at least sodium lauryl sulfate. The surfactant and the hydrophobic nanoparticles may have a weight ratio of 80:20. The acetone may have a percentage by weight of 1 wt % of a total weight of the nanoparticle dispersion.

In accordance with another aspect of the present disclosure, a hydrophobic bioplastic film for multiple-use may be provided. The hydrophobic bioplastic film may include a bioplastic film including chitosan, and a plurality of hydrophobic nanoparticles coating the bioplastic film.

In some implementations, the bioplastic film may include a polymer mixture including a first amount of chitosan powder, a second amount of starch, and a third amount of water. The polymer mixture may be mixed and heated with a fourth amount of glycerin and a fifth amount of acetic acid. The further mixed polymer mixture may be evenly distributed and dried to form the bioplastic film.

In some implementations, the first amount may be from 12 to 14 grams, the second amount may be from 12 to 14 grams, the third amount may be 180 to 200 milliliters, the fourth amount may be 10 milliliters, and the fifth amount may be 10 milliliters.

In some implementations, the polymer mixture may be heated at a temperature from 65 to 75° C., inclusive.

In some implementations, the bioplastic film may be vertically submerged into a nanoparticle dispersion including the plurality of hydrophobic nanoparticles, the hydrophobic nanoparticles may be directed towards the submerged bioplastic film, and the bioplastic film, coated with an aggregation of the plurality of hydrophobic nanoparticles, may be removed from the nanoparticle dispersion to form the hydrophobic bioplastic film.

In some implementations, the nanoparticle dispersion may include 100 micrograms of nanoparticle powder and isopropanol.

In some implementations, the isopropanol and the nanoparticle powder may be mixed at a ratio of 1 milliliter of isopropanol to 100 micrograms of nanoparticle powder.

In some implementations, the isopropanol and the nanoparticle powder may be mixed for a continuous period of 20 minutes.

In some implementations, the nanoparticle powder may include the plurality of hydrophobic nanoparticles. The plurality of hydrophobic nanoparticles may include at least silicon dioxide particles. The silicon dioxide particles may have an average particle size of 10 nanometers to 20 nanometers, inclusive.

In some implementations, the nanoparticle dispersion may be further mixed with a surfactant and acetone. The surfactant may include at least sodium lauryl sulfate. The surfactant and the hydrophobic nanoparticles may have a weight ratio of 80:20. The acetone may have a percentage by weight of 1 wt % of a total weight of the nanoparticle dispersion.

BRIEF DESCRIPTION OF DRAWINGS

Aspects of the present disclosure are best understood from the following detailed description when read with the accompanying figures. Various features are not drawn to scale. Dimensions of various features may be arbitrarily increased or reduced for clarity of discussion.

DESCRIPTION

Figure 1A:
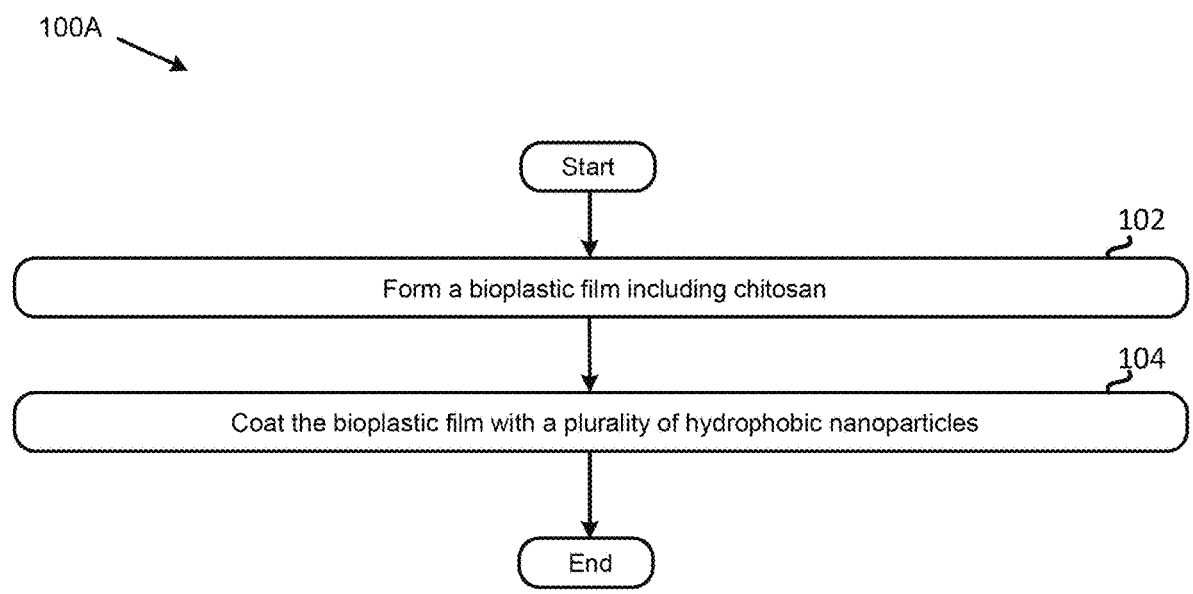
FIG. 1A is a flowchart illustrating an example method of manufacturing a hydrophobic bioplastic film in accordance with example implementations of the present disclosure.

The following disclosure contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art.

Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purposes of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in some implementations," or "in some such implementations," which may each refer to one or more of the same or different implementations. The term "comprising" means "including, but not necessarily limited to" and specifically indicates open-ended inclusion or membership in the so-described combination, group, series, and the equivalent. The expression "at least one of A, B and C" or "at least one of A, B or C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

The present disclosure provides a unique alternative to the petroleum-based plastics. Such alternative is a chitosan-based bioplastic film coated with hydrophobic nanoparticles and a manufacturing method thereof, which may provide films with high durability, water resistance, biodegradability, antimicrobial and antifungal properties, environmentally friendliness, longer shelf-life, multiple usages, low phytotoxicity, and low manufacturing cost. More specifically, with chitosan as the main biopolymer component of the chitosan-based bioplastic film according to the example chitosan-based bioplastic film coated with hydrophobic nanoparticles of the present disclosure, the chitosan-based bioplastic film may improve upon other bioplastics in terms of antimicrobial and antifungal properties. With hydrophobic nanoparticles coated on the chitosan-based bioplastic film, water resistance may also improve upon other bioplastic films. In some implementations, the chitosan-based bioplastic film coated with hydrophobic nanoparticles may prolong shelf-life up to 5 times more than that of other bioplastics. Thus, rendering the chitosan-based bioplastic film coated with hydrophobic nanoparticles of the present disclosure capable of providing a unique economic value in prolonging shelf-life, which may be suitable for the food packaging and preservation industry.

In one or more implementations of the present disclosure, a hydrophobic bioplastic film and a manufacturing method thereof aim to leverage the advantages of the chitosan-based bioplastics coated with hydrophobic nanoparticles. For example, such coated bioplastic films may be more environmentally friendly than a petroleum-based plastic film, yet be more durable and water resistant than a bioplastic-only film, thus improving the overall durability, water resistance, biodegradability, antimicrobial and antifungal properties, environmentally friendliness, product life, multiple usability, phytotoxicity, and manufacturing cost of a bioplastic/plastic film or product.

FIGS. 1A-1D are flowchart diagrams illustrating different implementations of a manufacturing method of a hydrophobic bioplastic film for multiple-use and with unique food preservation feature. FIG. 1A is a flowchart illustrating an example method of manufacturing a hydrophobic bioplastic film in accordance with example implementations of the present disclosure. In one or more implementations of the present disclosure, an example implementation 100A of the manufacturing method of the hydrophobic bioplastic film may include, in action 102, forming a bioplastic film including chitosan. The bioplastic film including chitosan may, in action 104, be coated with a plurality of hydrophobic nanoparticles.

Figure 1B:
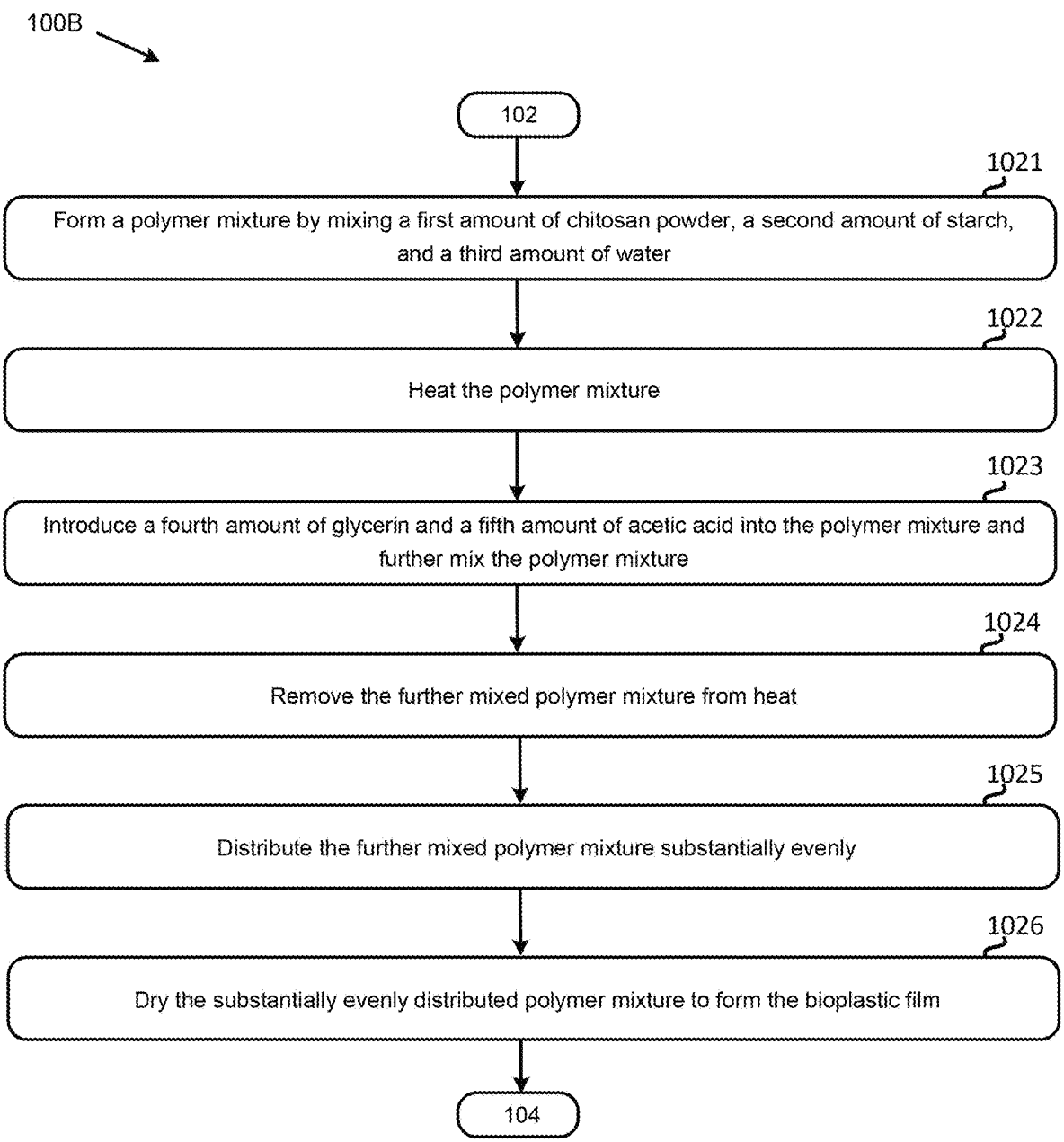
FIG. 1B is a flowchart illustrating an example method of forming a bioplastic film of the hydrophobic bioplastic film in accordance with example implementations of the present disclosure.

FIG. 1B is a flowchart illustrating an example method of forming a bioplastic film of the hydrophobic bioplastic film in accordance with example implementations of the present disclosure. In some implementations, forming the bioplastic film including chitosan, in action 102 of the example implementation 100A, may include forming a polymer mixture. In an example implementation 100B, the polymer mixture, in action 1021, may be formed by evenly mixing in a first amount of chitosan powder and a second amount of starch into a third amount of water. In some such implementations, the polymer mixture may be formed by evenly mixing in approximately 12 to 14 grams of chitosan powder and 12 to 14 grams of starch into 180 to 200 milliliters of water. In some such implementations, approximately 14 grams of chitosan powder, 14 grams of starch, and 190 milliliters of water may be mixed together to formed the polymer mixture. In some implementations, the mixed polymer mixture, in action 1022, may be heated. In some such implementations, the mixed polymer mixture may be heated at a temperature from approximately 65° C. to 75° C. for approximately 10 to 20 minutes.

In some implementations, a fourth amount of glycerin and a fifth amount of acetic acid, in action 1023, may be further mixed into the polymer mixture after heating. In some such implementations, approximately 10 milliliters of glycerin and 10 milliliters of acetic acid may be further mixed into the polymer mixture after heating. In some such implementations, the heating may be for 20 minutes. In some implementations, the heating may take place after, instead of prior to, the addition of the glycerin and the acetic acid as long as the polymer mixture is mixed at the aforementioned temperature range and timing until the polymer mixture appears translucent/transparent and viscous. In some implementations, after heating for the aforementioned timing, the heated polymer mixture, in action 1024, may be removed from further heating.

In some implementations, the polymer mixture removed from heat, in action 1025, may be substantially evenly distributed. In some such implementations, the polymer mixture may be flattened evenly on a flat surface to distribute the polymer mixture substantially evenly. In some such implementations, the substantially evenly distributed polymer mixture, in action 1026, may be dried to form the chitosan bioplastic film of the example implementation 100B. In some such implementations, the substantially evenly distributed polymer mixture may be dried and cooled at room temperature of 22-25° C. for even crystallization. In some implementations, the chitosan bioplastic film may be coated with a nanoparticle dispersion including the plurality of hydrophobic nanoparticles in action 104 of the example implementation 100A.

Figure 1C:
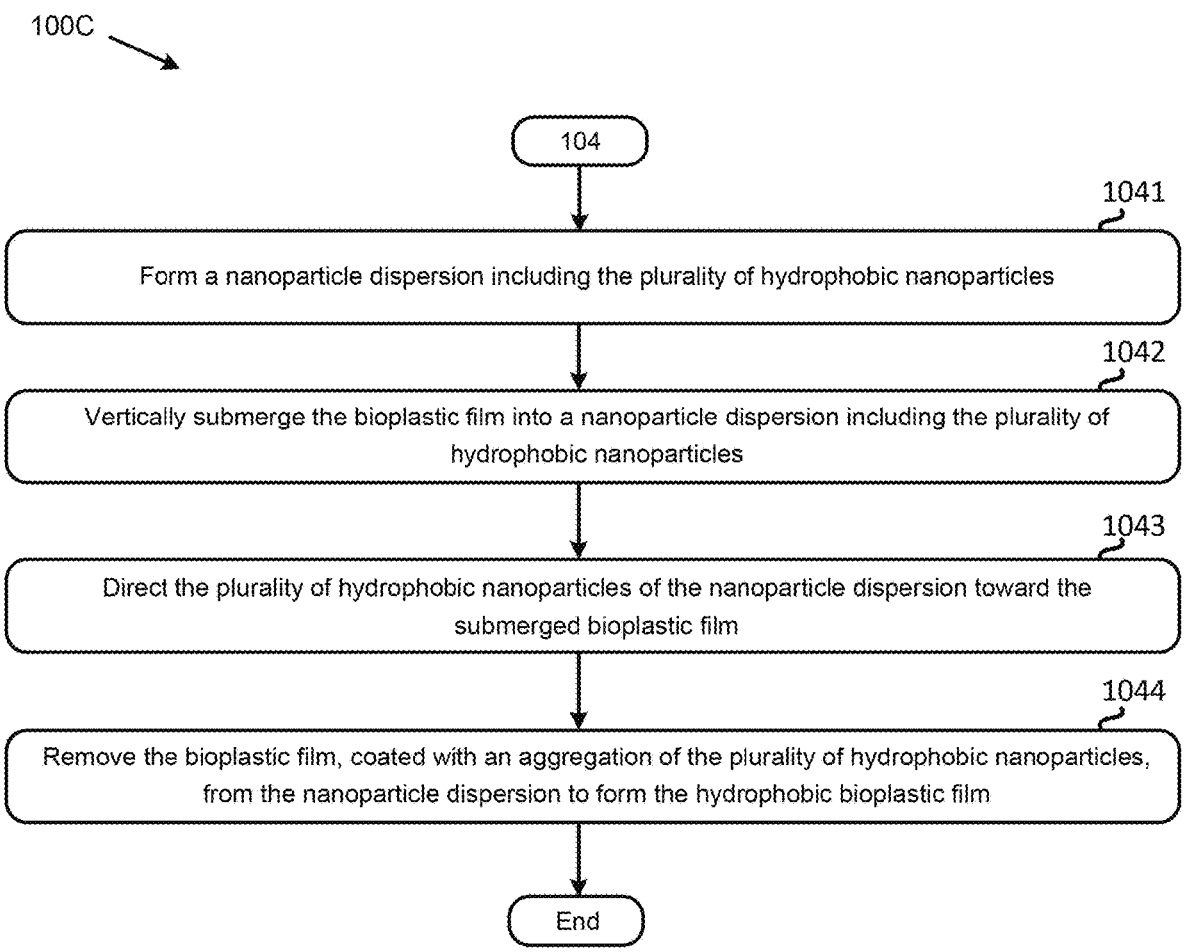
FIG. 1C is a flowchart illustrating an example method of coating the bioplastic film of the hydrophobic bioplastic film in accordance with example implementations of the present disclosure.
Figure 1D:
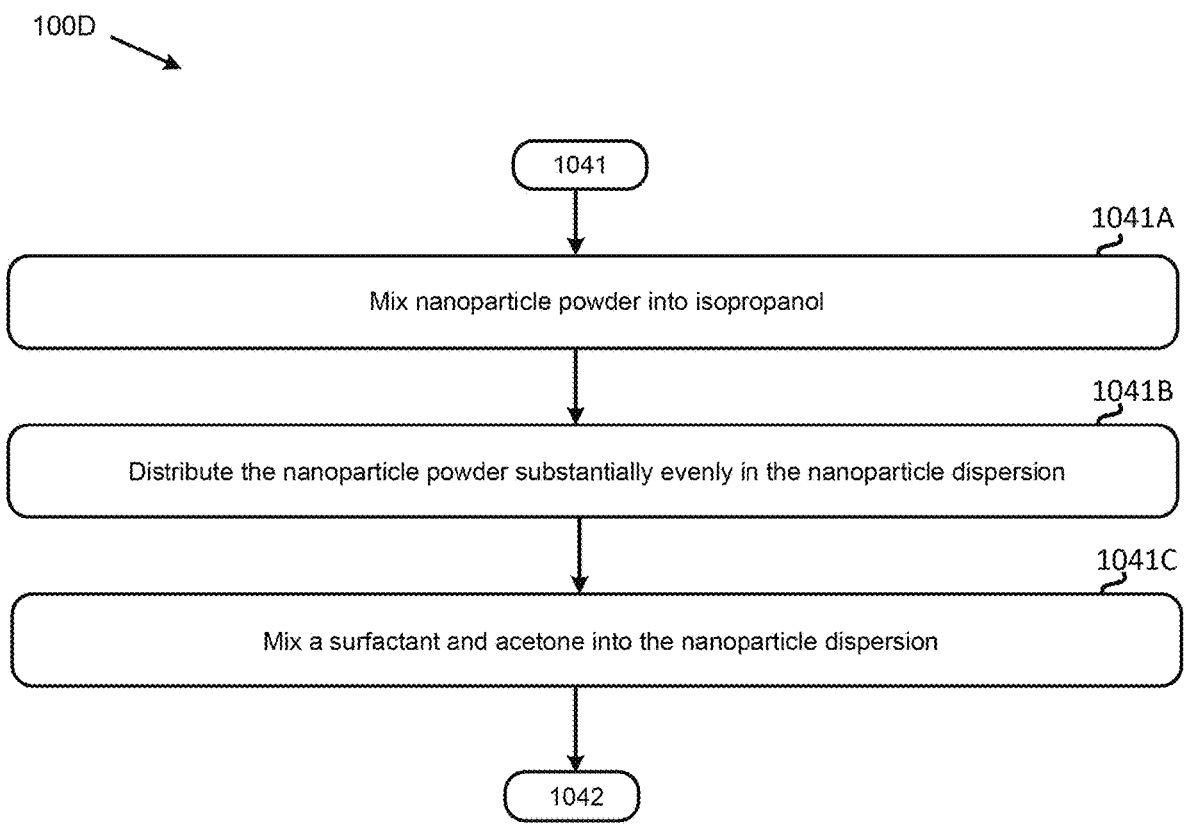
FIG. 1D is a flowchart illustrating an example method of forming a nanoparticle dispersion for coating the bioplastic film in FIG. 1C in accordance with example implementations of the present disclosure.
Figure 2A:
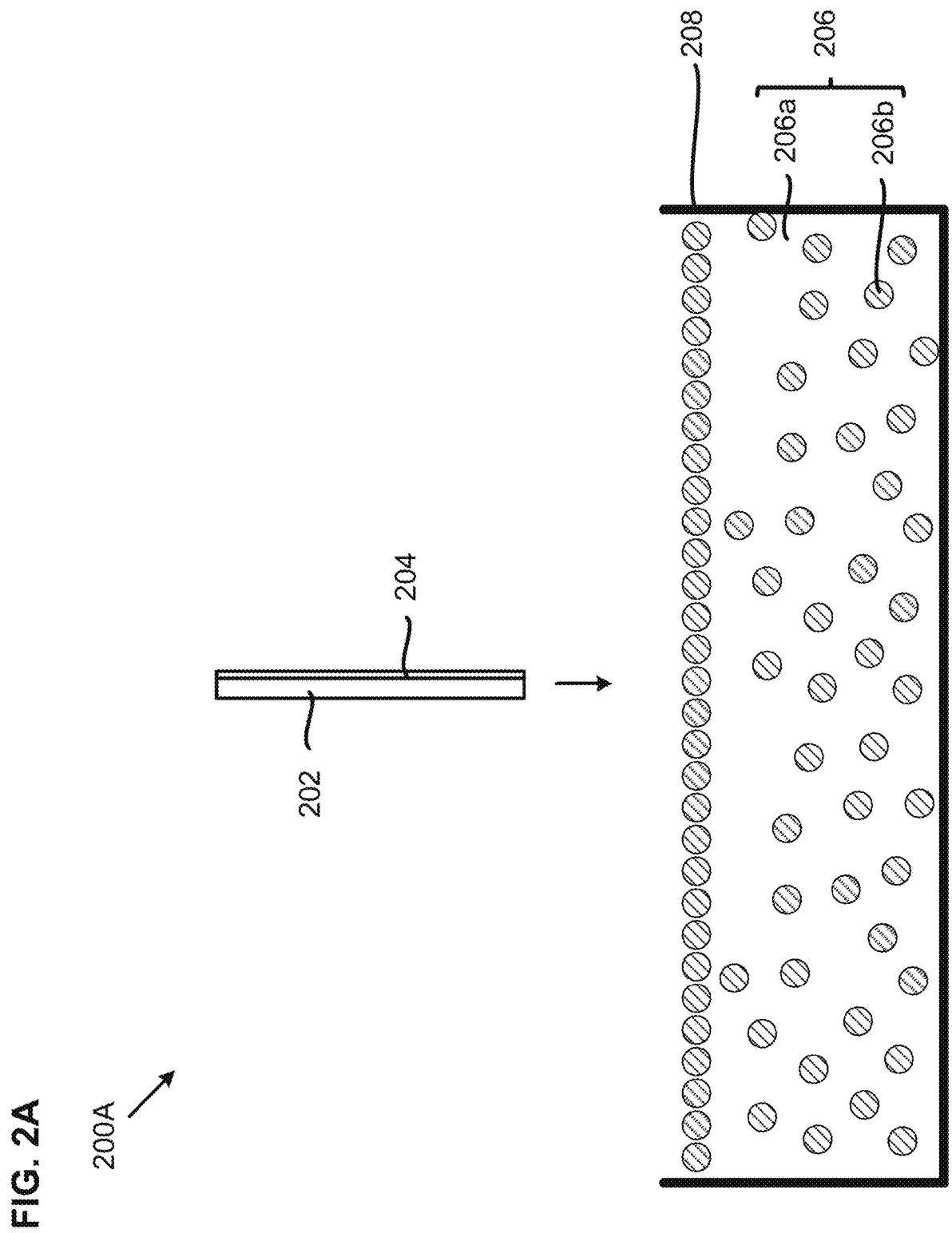
FIGS. 2A, 2B, 2C, and 2D are diagrams illustrating an example method of coating a bioplastic film with hydrophobic nanoparticles for multiple-use in accordance with example implementations of the present disclosure.
Figure 2B:
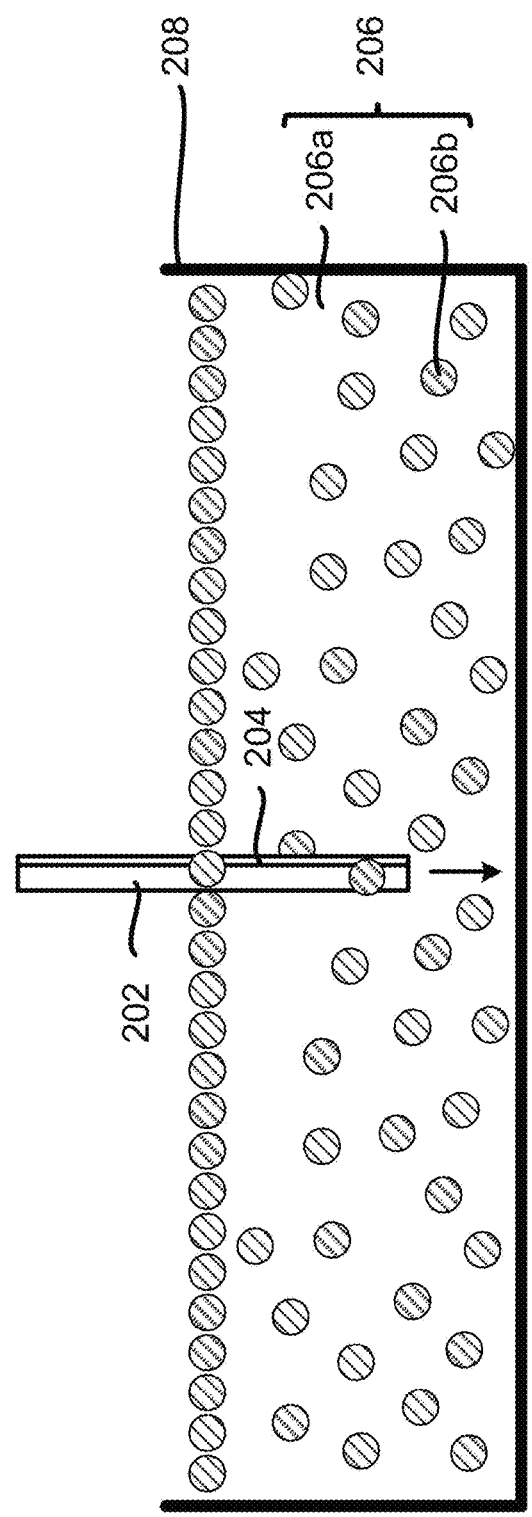
Figure 2C:
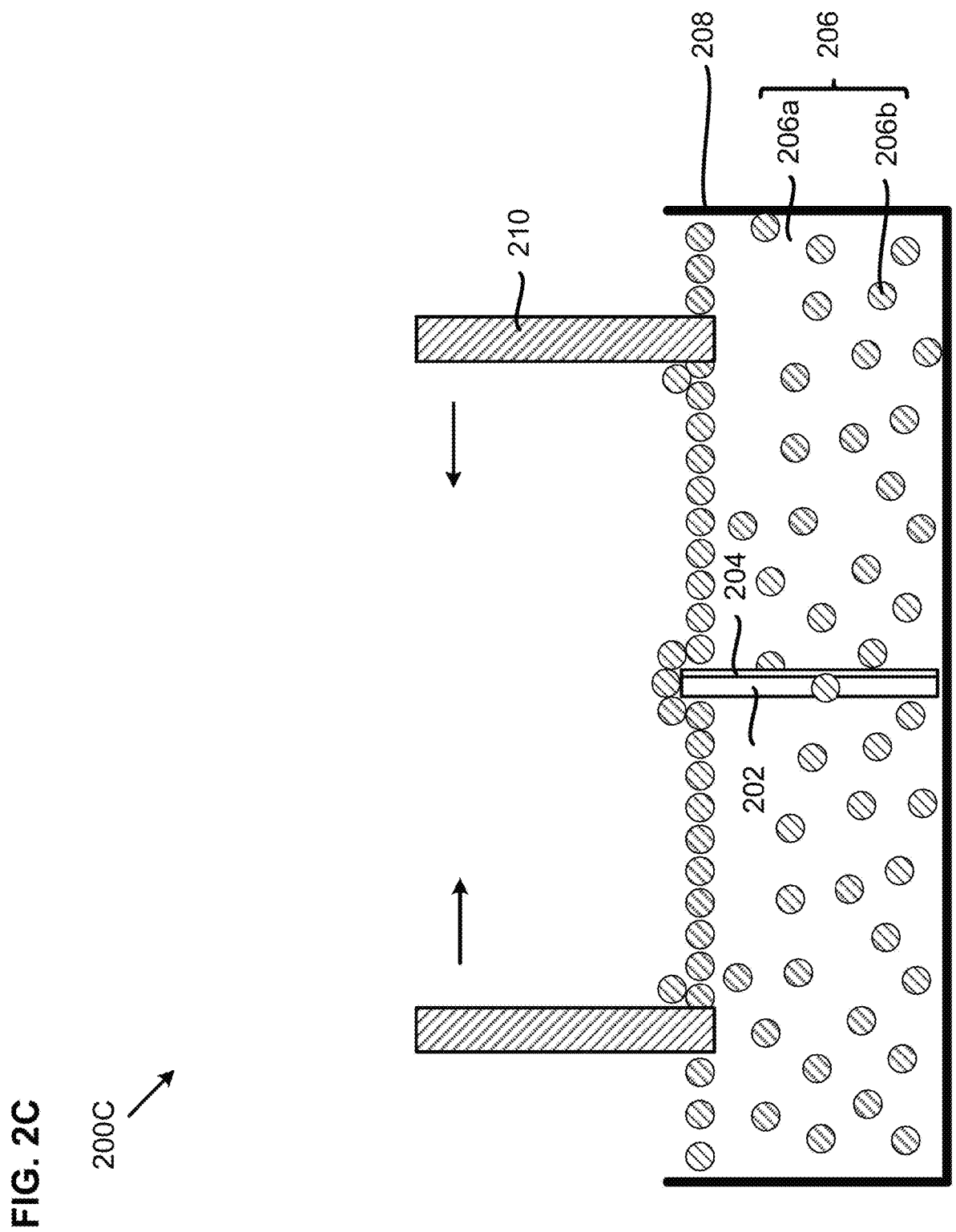
Figure 2D:
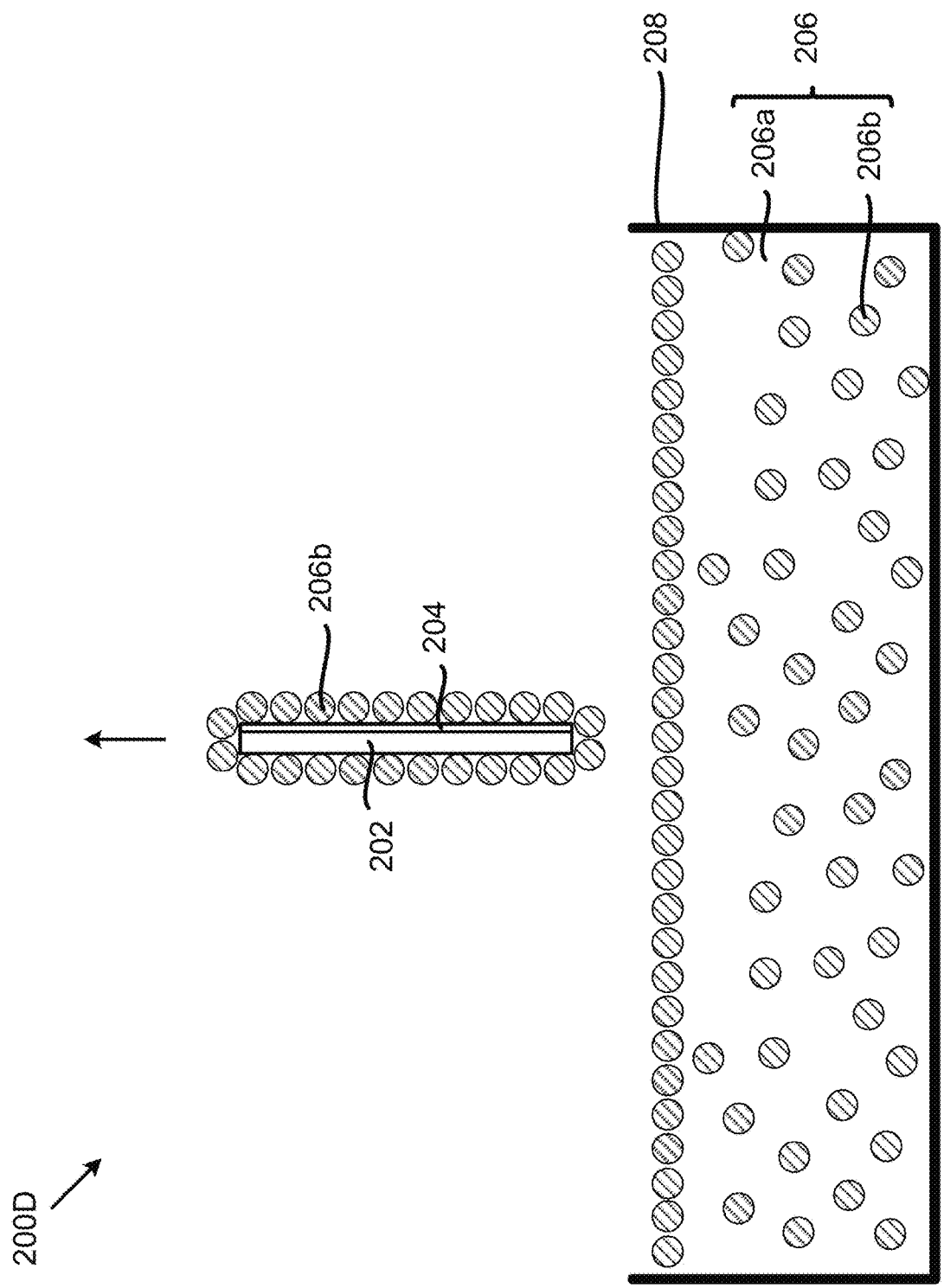

FIG. 1C is a flowchart illustrating an example method of coating the bioplastic film of the hydrophobic bioplastic film in accordance with example implementations of the present disclosure. FIG. 1D is a flowchart illustrating an example method of forming a nanoparticle dispersion for coating the bioplastic film in FIG. 1C in accordance with example implementations of the present disclosure. After forming the dried bioplastic film in the example implementation 100B, the dried bioplastic film may be submerged into a nanoparticle dispersion including the plurality of hydrophobic nanoparticles. In some implementations, the hydrophobic nanoparticle dispersion, in action 1041 of an example implementation 100C in FIG. 1C, may be formed by referring to an example implementation 100D in FIG. 1D.

In the example implementation 100D, the hydrophobic nanoparticle dispersion including the plurality of hydrophobic nanoparticles, in action 1041A, may be formed by mixing a nanoparticle powder into isopropanol. In some implementations, the nanoparticle powder may include the plurality of hydrophobic nanoparticles. In some such implementations, the plurality of hydrophobic nanoparticles may include at least silicon dioxide ($SiO_2$) particles. In some such implementations, the $SiO_2$ particles may have an average particle size from approximately 10 nanometers to 20 nanometers. In some such implementations, the $SiO_2$ particles may be 99.5% surface modified. In some such implementations, 0.01 gram of the $SiO_2$ particles may be applied to form the hydrophobic nanoparticle dispersion.

In some implementations, the isopropanol for forming the hydrophobic nanoparticle dispersion may be 99% in purity. In some implementations, 100 micrograms of nanoparticle powder including the plurality of hydrophobic nanoparticles may be mixed into the isopropanol at a ratio of 100 micrograms of the nanoparticle powder to 1 milliliter of the isopropanol.

In some implementations, the nanoparticle powder, in action 1041B, may be substantially evenly distributed in the nanoparticle dispersion. In some such implementations, the nanoparticle powder may be substantially evenly distributed by mixed into the isopropanol at a steady state and thoroughly. In some such implementations, the nanoparticle powder and the isopropanol may be mixed for a continuous period of 20 minutes.

In some implementations, after the hydrophobic nanoparticle dispersion is thoroughly mixed, a surfactant and acetone, in action 1041C, may be added to form the hydrophobic nanoparticle dispersion of the example implementation 100D. In some implementations, the surfactant may include at least sodium lauryl sulfate. In some such implementations, the surfactant and the hydrophobic nanoparticles in the nanoparticle powder may have a weight ratio of 80:20. In some such implementations, the surfactant and the hydrophobic nanoparticles may be mixed thoroughly by shaking for 5 minutes continuously. In some implementations, 0.04 grams of sodium lauryl sulfate may be applied to form the hydrophobic nanoparticle dispersion. In some implementations, by adding the acetone, the modified $SiO_2$ nanoparticles may be phase-transferred in the non-aqueous isopropanol, free silica nanoparticles may be dissolved, and a layer of linear-chained polystyrene may be removed. In some implementations, the acetone may be added to the hydrophobic nanoparticle dispersion in 1% by weight with respect to the surfactant and $SiO_2$ solution. In some implementations, 40 milliliters of acetone may be mixed into the hydrophobic nanoparticle dispersion. In some implementations, the 0.04 grams of sodium lauryl sulfate may be applied to the hydrophobic nanoparticle dispersion after or before the addition of the 40 milliliters of acetone.

In some implementations, the hydrophobic nanoparticle dispersion including the nanoparticle powder, the isopropanol, the surfactant, and the acetone may be thoroughly mixed as described. In some other implementations, the nanoparticle powder, the isopropanol, the surfactant, and the acetone may be thoroughly mixed at approximately 1500 revolutions per minute (RPM) for approximately 30 minutes and at a temperature of approximately 25° C. However, the order of mixing is not limited to the example implementations provided herein as long as the hydrophobic nanoparticles in the nanoparticle powder are evenly distributed in the hydrophobic nanoparticle dispersion.

In some implementations, the hydrophobic nanoparticle dispersion may be determined for hydrophobicity verification. In some such implementations, a mixture of deionized (DI) water and a hydrophobicity indicator (e.g., food coloring, etc.) may be introduced on the hydrophobic nanoparticle dispersion that is held by a container (e.g., a petri dish, etc.) to test for hydrophobicity. Hydrophobicity may be determined by other methods and is not limited to the examples provided herein.

In some implementations, the dried chitosan bioplastic film that is formed, in action 102 of the example implementation 100B in FIG. 1B, may be vertically submerged into the hydrophobic nanoparticle dispersion formed in the example implementation 100D in FIG. 1D. In some implementations, the dried chitosan bioplastic film, in action 1042 of example implementation 100C, may be vertically submerged into the hydrophobic nanoparticle dispersion that includes the plurality of hydrophobic nanoparticles. In some such implementations, the dried chitosan bioplastic film may be submerged for 30 seconds to allow sufficient time to completely wet the chitosan bioplastic film and a substrate that holds the submerged bioplastic film in place.

In some implementations, the plurality of hydrophobic nanoparticles in the nanoparticle dispersion, in action 1043, may be directed towards the submerged chitosan bioplastic film. In some such implementations, the plurality of hydrophobic nanoparticles may be directed evenly on the submerged chitosan bioplastic film. In some implementations, the hydrophobic nanoparticles may be directed towards the submerged chitosan bioplastic film with disinfected or sterilized media, such as disinfected sticks, but are not limited to the examples provided herein.

In some implementations, after the plurality of hydrophobic nanoparticles are directed towards the submerged chitosan bioplastic film, an aggregation of the hydrophobic nanoparticles in the hydrophobic nanoparticle dispersion, in action 1044, may further coat the chitosan bioplastic film as the chitosan bioplastic film is removed from the hydrophobic nanoparticle dispersion. In some such implementations, the chitosan bioplastic film may be coated with the aggregation of the hydrophobic nanoparticles as the chitosan bioplastic film is slowly uplifted and removed from the hydrophobic nanoparticle dispersion. In some implementations, the chitosan bioplastic film coated with hydrophobic nanoparticles may be air dried.

FIGS. 2A-2D are diagrams illustrating an example method of coating a bioplastic film with hydrophobic nanoparticles for multiple-use and with unique food preservation feature in accordance with example implementations of the present disclosure. FIGS. 2A-2D may further illustrate coating of a chitosan bioplastic film with hydrophobic nanoparticles as discussed in the example implementation 100C of FIG. 1C. In one or more implementations, formation of a chitosan bioplastic film (e.g., chitosan bioplastic film 204 in example implementations 200A, 200B, 200C, and 200D of FIGS. 2A, 2B, 2C, and 2D) may be similar to that in the example implementation 100B in FIG. 1B and formation of the hydrophobic nanoparticle dispersion (e.g., hydrophobic nanoparticle dispersion 206 in the example implementations 200A-200D of FIGS. 2A-2D) may be similar to that in the example implementation 100D in FIG. 1D; thus, details regarding the formation of the chitosan bioplastic film 204 and the hydrophobic nanoparticle dispersion 206 are omitted for brevity.

In the present disclosure, example implementations 200A-200D of FIGS. 2A-2D may illustrate coating a chitosan bioplastic film with hydrophobic nanoparticles for multiple-use and with unique food preservation feature. In some implementations similar to the example implementation 200A, a substrate 202 may retain a chitosan bioplastic film 204. In some implementations, a hydrophobic nanoparticle dispersion 206 may include a plurality of hydrophobic nanoparticles 206b and a mixed solution 206a including isopropanol, surfactant, and acetone. The hydrophobic nanoparticle dispersion 206 may be accommodated by a container 208 (e.g., glass beaker, etc.). In some implementations similar to the example implementation 200B, the chitosan bioplastic film 204 along with the substrate 202 may be vertically and fully submerged into the hydrophobic nanoparticle dispersion 206. In some such implementations, the vertical submersion of the chitosan bioplastic film 204 may be similar to that of a dip-coated technique, but is not limited to the example implementations provided herein.

In some implementations similar to the example implementation 200C, the plurality of hydrophobic nanoparticles 206b in the hydrophobic nanoparticle dispersion 206 may be directed towards the fully submerged chitosan bioplastic film 204 and the substrate 202 by a physical medium 210. In some such implementations, the plurality of hydrophobic nanoparticles 206b may be slowly pushed from the outer edges of the container 208 towards or onto the chitosan bioplastic film 204 by the physical medium 210. In some such implementations, a pair of disinfected or sanitized sticks 210 in a parallel configuration with respect to the chitosan bioplastic film 204 may be used to slowly push the plurality of hydrophobic nanoparticles 206b from the outer edges of the container 208 towards or onto the submerged chitosan bioplastic film 204 until the submerged substrate 202 and the chitosan bioplastic film 204 are completely wet within the hydrophobic nanoparticle dispersion 206. In some such implementations, the directing of the hydrophobic nanoparticles onto the chitosan bioplastic film may be similar to that of a Langmuir-Blodgett technique, but is not limited to the example implementations provided herein.

In some implementations similar to the example implementation 200D, after the directing of the hydrophobic nanoparticles 206b onto the chitosan bioplastic film 204, the chitosan bioplastic film 204 that is coated with the hydrophobic nanoparticles 206b on at least a surface of the chitosan bioplastic film 204 may be removed from the hydrophobic nanoparticle dispersion 206 to form the hydrophobic chitosan bioplastic film of the present disclosure. In some such implementations, the hydrophobic chitosan bioplastic film may be air dried.

In some implementations of the present disclosure, coating of the chitosan bioplastic film with hydrophobic nanoparticles may be provided with different techniques and are not limited to the example techniques provided herein. In some such implementations, the hydrophobic nanoparticle dispersion may be coated onto the bioplastic film using at least one of the Langmuir-Blodgett technique, dip-coating, or spin-coating.

In the present disclosure, studies are performed on characteristics of the hydrophobic chitosan bioplastic film with respect to petroleum-based bioplastics (e.g., polyethylene resin bags) and other bioplastics (e.g., polylactic acid filament corn film or PLA Corn Film) in terms of water resistance, mechanical strength, degradability rate through mass loss, phytotoxicity, water permeability and humidity, biodegradability in water and soil, and food preservability.

Figure 3A:
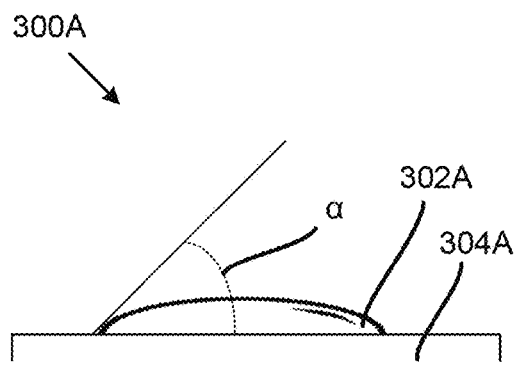
FIGS. 3A and 3B are diagrams illustrating water resistance between bioplastic films coated with and without hydrophobic nanoparticles.
Figure 3B:
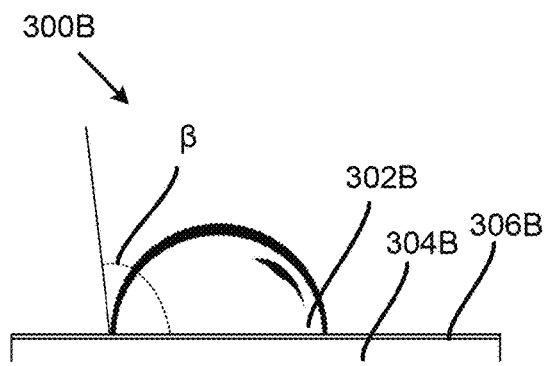

FIGS. 3A and 3B are diagrams illustrating water resistance effect between bioplastic films coated with and without hydrophobic nanoparticles. In some implementations, the extent of water resistance that a surface provides may be determined by the surface's hydrophobicity, which may be quantified by performing a static water contact angle (°) test on the surface. In an example implementation 300A, a static water contact angle test is performed by introducing a droplet of water 302A on a surface of a chitosan bioplastic film 304A (Uncoated Film 1) as shown in FIG. 3A. In some such implementations, a water contact angle $\alpha$ is approximately 46°. In another example implementation 300B, a water contact angle test is performed by introducing a droplet of water 302B on a surface of a hydrophobic nanoparticle coating 306B that is formed on a chitosan bioplastic film 304B (Coated Film 1) based on the present disclosure. In some such implementations, a water contact angle $\beta$ is approximately 117°. By comparison, the example implementation 300B regarding the chitosan bioplastic film 304B coated with the hydrophobic nanoparticle coating 306B (Coated Film 1) of the present disclosure provides a higher water contact angle with respect to the example implementation 300A regarding the non-coated chitosan bioplastic film 304A (Uncoated Film 1). In terms of hydrophobicity, a surface is considered to be hydrophobic when the static water contact angle is greater than 90°. On the other hand, a surface is considered to be hydrophilic when the static water contact angle is less than 90°. As such, the Coated Film 1 is considered hydrophobic, which may be considered high water resistance, which allows multiple use of the film, while the Uncoated Film 1 is considered hydrophilic.

Figure 3C:
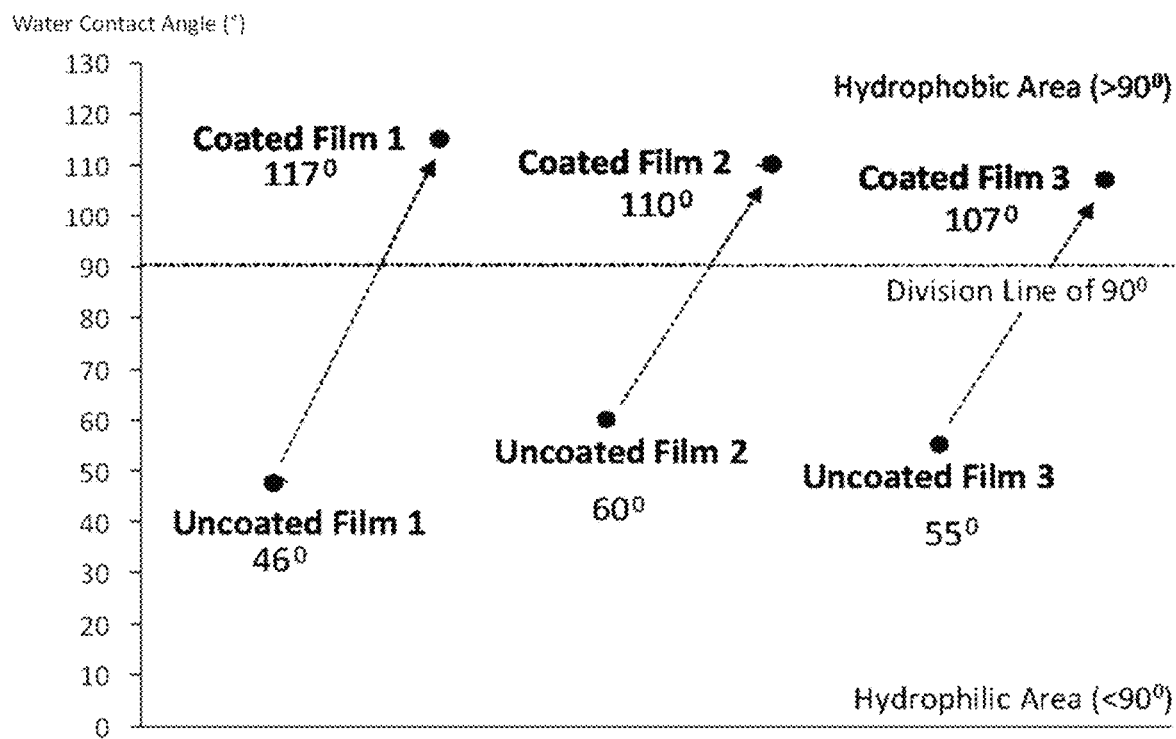
FIG. 3C is a graph further illustrating water resistance between bioplastic films coated with and without hydrophobic nanoparticles.

FIG. 3C is a graph further illustrating water resistance effect (demonstrated by water contact angle) between bioplastic films coated with and bioplastic films without hydrophobic nanoparticles. In addition to the water contact angle testing performed on the chitosan bioplastic film coated with the hydrophobic nanoparticle coating (e.g., Coated Film 1) and the non-coated chitosan bioplastic film (e.g., Uncoated Film 1) in the example implementations 300A and 300B, water contact angle tests were also performed on two other sets of coated (chitosan bioplastic films coated with the hydrophobic nanoparticle coating) films and uncoated (non-coated chitosan bioplastic films) films, such as Coated Film 2, Uncoated Film 2, Coated Film 3, and Uncoated Film 3, as shown in FIG. 3C. For Coated Film 2 with respect to Uncoated Film 2, Coated Film 2 has a water contact angle of 110° and Uncoated Film 2 has a water contact angle of 60°, which indicates that Coated Film 2 is considered hydrophobic while Uncoated Film 2 is considered hydrophilic. Similar to Coated Film 2 and Uncoated Film 2, Coated Film 3 with respect to Uncoated Film 3 shows similarity in terms of the magnitude of difference in the contact angle. Specifically, Coated Film 3 has a water contact angle of 107° and Uncoated Film 3 has a water contact angle of 55°, which indicates that Coated Film 3 is considered hydrophobic while Uncoated Film 3 is considered hydrophilic.

Figures 4A, 4B:
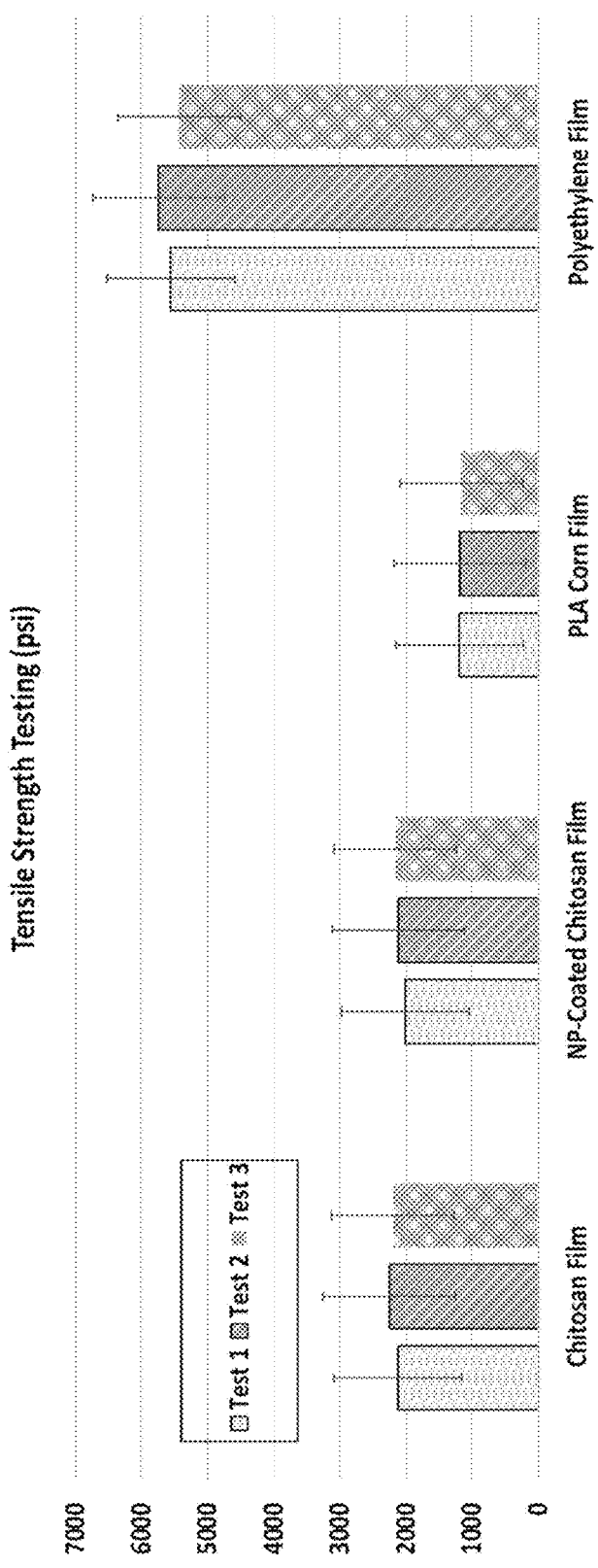
FIG. 4A is a graph illustrating mechanical strength between bioplastic films coated with hydrophobic nanoparticles and various plastic films.
FIG. 4B is a table illustrating mechanical strength between bioplastic films coated with hydrophobic nanoparticles and various plastic films.

FIGS. 4A and 4B are a graph and table, respectively, illustrating mechanical strength (e.g., tensile strength) between bioplastic films coated with hydrophobic nanoparticles and various plastic films. In some implementations, studies were performed to determine the mechanical properties of chitosan bioplastic film coated with hydrophobic nanoparticles (e.g., NP-Coated Chitosan Film) with respect to chitosan bioplastic film (e.g., Chitosan Film), another bioplastic film (e.g., PLA Corn Film), and petroleum-based plastic film (e.g., Polyethylene Film).

In some implementations, mechanical strength of a film may be determined by performing tests, such as applying a tensile strength test, on a film to determined tensile strength in pounds per square inch (psi). In some implementations, the tensile strength test may be performed by attaching the chitosan bioplastic film coated with hydrophobic nanoparticles to a force meter, and pulling on the two ends of the chitosan bioplastic film coated with hydrophobic nanoparticles substantially simultaneously until breakage occurs to determine the tensile strength of the chitosan bioplastic film coated with hydrophobic nanoparticles. In some such implementations, the tensile strength test may include a force meter that is suspended by a string, which is attached to a plank being positioned parallel to a flat ground. The chitosan bioplastic film coated with hydrophobic nanoparticles may wrap around a hook of a force meter, and two ends of the chitosan bioplastic film coated with hydrophobic nanoparticles are pulled substantially simultaneously until breakage to determine the tensile strength of the chitosan bioplastic film coated with hydrophobic nanoparticles. In some such implementations, three repeated tensile strength tests, Test 1, Test 2, and Test 3 in FIGS. 4A and 4B, were performed on chitosan bioplastic film (e.g., a 50:50 mass ratio of starch to chitosan) coated with hydrophobic nanoparticles (e.g., NP-Coated Chitosan Film) with respect to chitosan bioplastic film (e.g., Chitosan Film), another bioplastic film (e.g., PLA Corn Film), and petroleum-based plastic film (e.g., Polyethylene Film). Results from the three tests, in FIGS. 4A and 4B, indicate that NP-Coated Chitosan Film and Chitosan Film provide similar average tensile strengths that are greater than (e.g., almost double) the average tensile strength of the PLA Corn Film while less than the average tensile strength of the Polyethylene Film.

In some implementations, tensile strength of the chitosan bioplastic film coated with hydrophobic nanoparticles may be determined by other methods, such as universal testing machines (UTM), but are not limited to the example test methods provided herein.

Figure 5A:
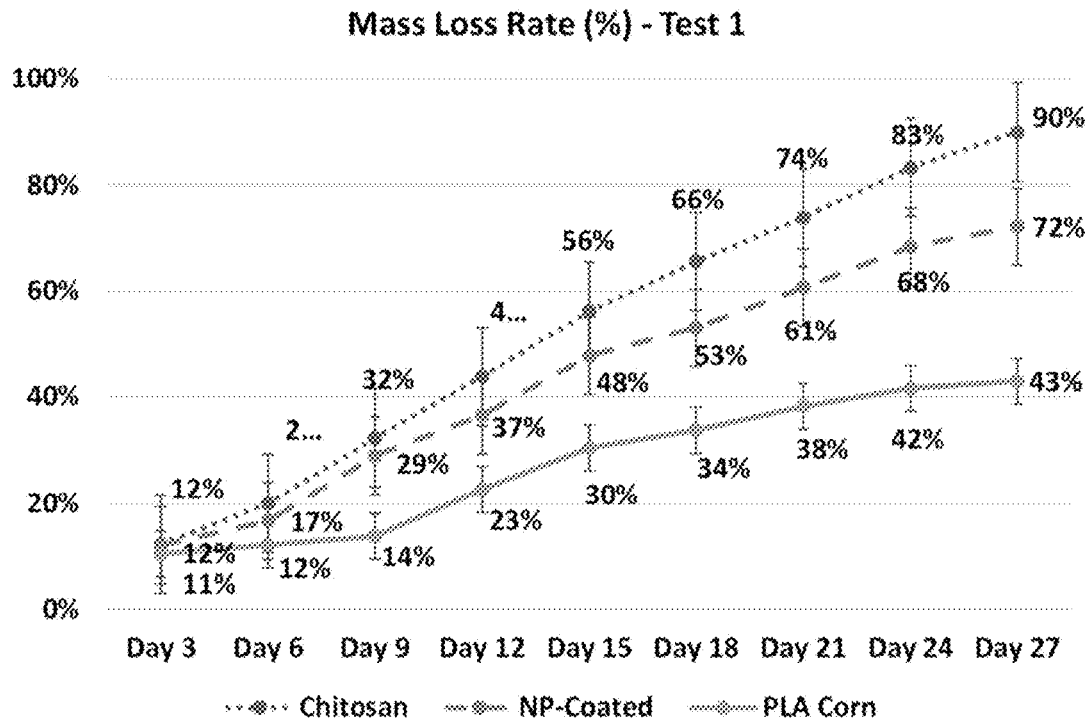
FIGS. 5A, 5B, and 5C are graphs illustrating film mass loss rate between bioplastic films coated with hydrophobic nanoparticles and various plastic films.
Figure 5B:
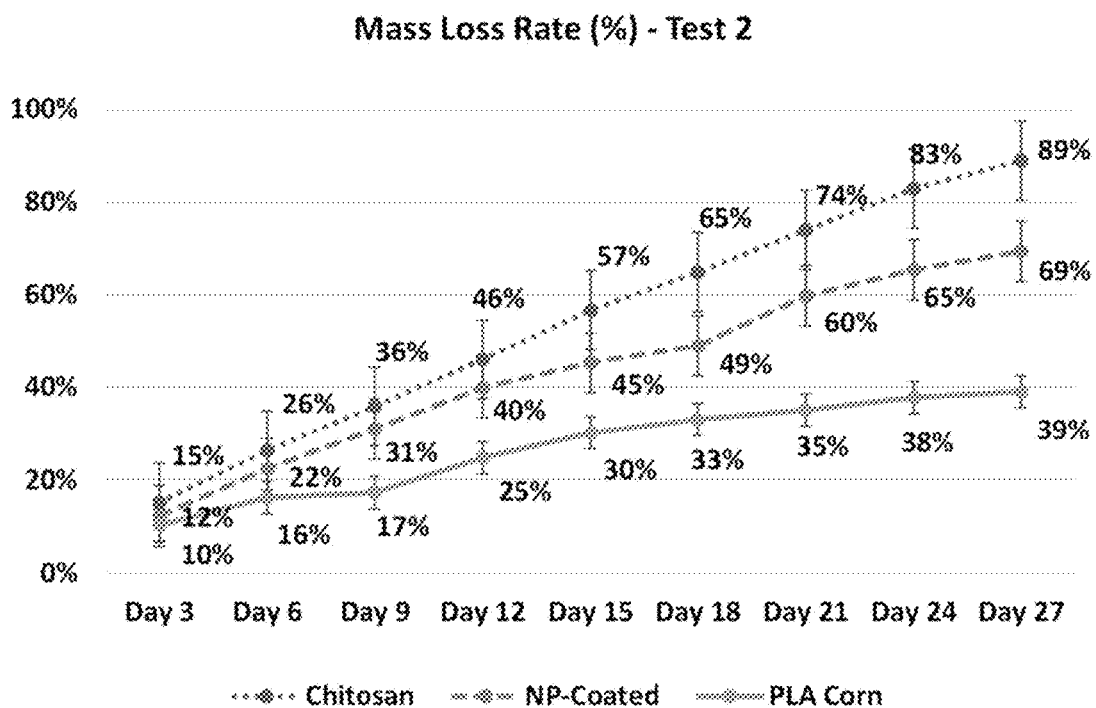
Figure 5C:
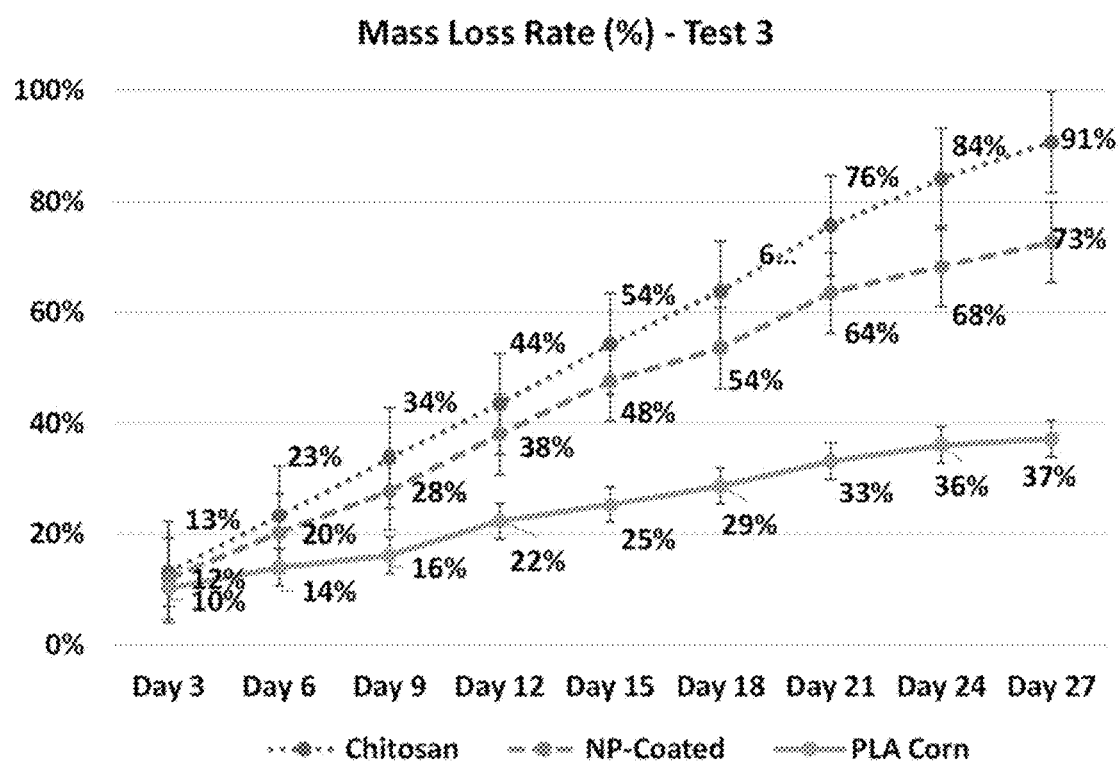

FIGS. 5A, 5B, and 5C are graphs illustrating film mass loss rate between bioplastic films coated with hydrophobic nanoparticles and various plastic films in soil biodegradability tests. In some implementations, studies were performed to determine the degradation rate of chitosan bioplastic film coated with hydrophobic nanoparticles (e.g., NP-Coated Chitosan Film) with respect to chitosan bioplastic film (e.g., Chitosan Film), another bioplastic film (e.g., PLA Corn Film), and petroleum-based plastic film (e.g., Polyethylene Film). In some such implementations, the petroleum-based plastic film was used as a baseline to measure degradability (e.g., mass loss rate) against the above-mentioned films due to its high tolerance to degradation.

In some implementations, degradation rate of a film may be determined by performing tests, such as a mass loss test to compare the rate of degradation of an NP-Coated Chitosan Film with respect to a Chitosan Film and a PLA Corn Film. In some such implementations, the rate of degradation of the NP-Coated Chitosan Film with respect to the Chitosan Film and the PLA Corn Film is studied over a period of 30 days and is repeated three times in three tests, Test 1, Test 2, and Test 3, in FIGS. 5A-5C, respectively. In each of the three tests, a gradual decrease of mass loss is clear as the days progress. On the $27^{th}$ day, the mass loss of the Chitosan Film ranges from 89-91% and the mass loss of the NP-Coated Chitosan Film ranges from 69-73%, as compared to the mass loss of the PLA Corn Film at 37-43%. As such, NP-Coated Chitosan Film and Chitosan Film may provide significantly faster degradation, while NP-Coated Chitosan Film may degrade double the rate of PLA Corn Film. In at least some examples, faster degradation may make NP-Coated Chitosan Film exceptionally environmentally-friendly.

Figure 6A:
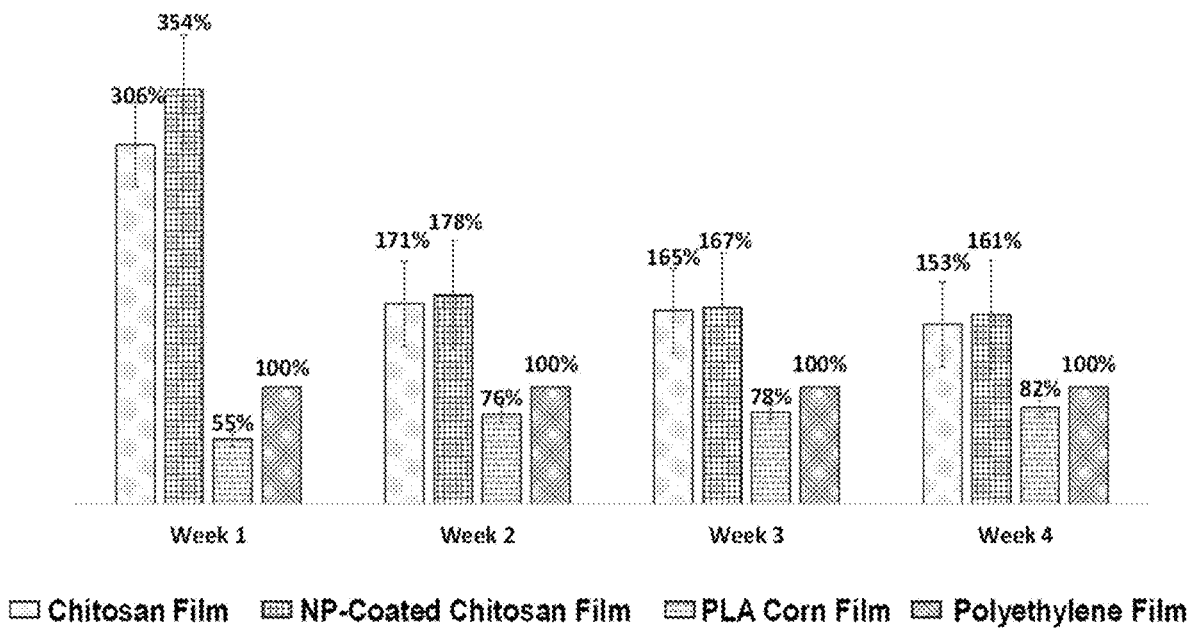
FIGS. 6A and 6B are graphs illustrating plant seeds growth rate between soil embedded with bioplastic films coated with hydrophobic nanoparticles and soil embedded with various plastic films in phytotoxicity tests.
Figure 6B:
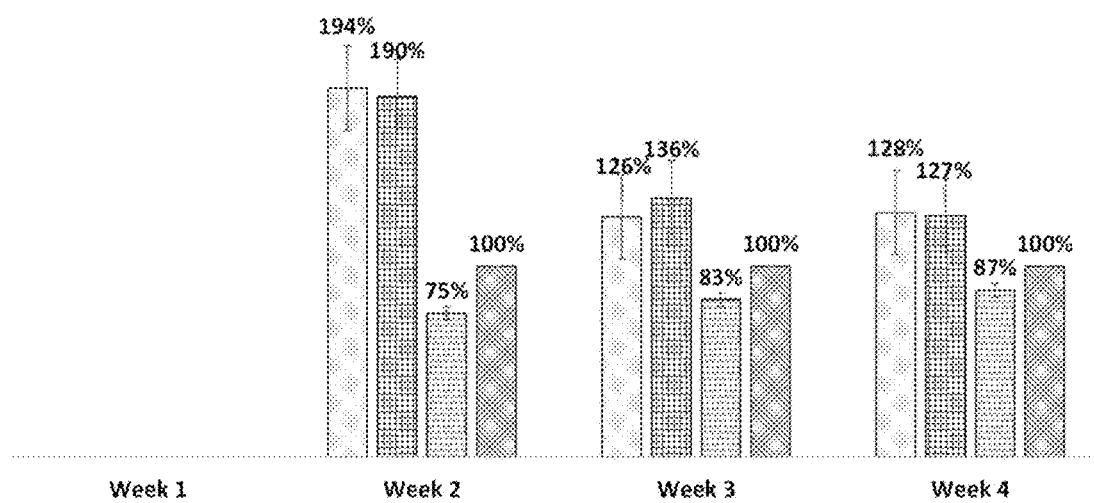

FIGS. 6A and 6B are graphs illustrating plant seeds growth rate between soil embedded with bioplastic films coated with hydrophobic nanoparticles and various plastic films in phytotoxicity tests. In some implementations, studies were performed to determine the phytotoxicity of chitosan bioplastic film coated with hydrophobic nanoparticles (e.g., NP-Coated Chitosan Film) with respect to chitosan bioplastic film (e.g., Chitosan Film), another bioplastic film (e.g., PLA Corn Film), and the petroleum-based plastic film (e.g., Polyethylene Film).

In some implementations, degradation of chemicals, such as that from plastic film, may release toxic by-products, which can harm crop growth in the agriculture industry. Thus, studying the phytotoxicity of a film may determine the extent of the effect that a film may have on agriculture products. Phytotoxicity may be determined by performing tests, such as a growth test to compare the phytotoxicity of an NP-Coated Chitosan Film with respect to a Chitosan Film, a PLA Corn Film, and a Polyethylene Film.

In some implementations, a growth test may be performed on an agriculture product, such as mung bean seed or red bean seed. In some such implementations, five mung bean seeds are planted in each of four compost bins containing soils, and each compost bin also includes one of the four biodegraded plastic film, Chitosan Film, NP-coated Chitosan Film, Polyethylene Film, and PLA Corn film to observe plant growth for 30 days. In some such implementations, five red bean seeds are planted in each of four compost bins containing soil, and each compost bin is covered with one of the four biodegraded plastic films (Chitosan Film, NP-coated Chitosan Film, Polyethylene Film, and PLA corn film) to observe plant growth for 30 days. Mung bean seeds and red bean seeds under each type of plastic film were growing at various speeds throughout the span of 30 days. After 30 days of growth, all seeds sprouted into mung bean and red bean sprouts with 100% survival rate, with no phytotoxicity shown. In some implementations, mung beans planted in soil with degraded Chitosan Film and NP-Coated Chitosan Film grew 50-60% taller than mung beans that were planted in soils with Polyethylene Film, and grew even taller than mung beans that were planted with soil including PLA Corn Film. In some implementations, red beans planted in soil with degraded Chitosan Film and NP-Coated Chitosan Film grew 20-30% taller than mung beans that were planted in soil with Polyethylene Film, and even grew taller than red beans that were planted with soil including PLA Corn Film. The seeds planted with soil and Chitosan Films (NP-Coated or not coated) exhibited a plant growth of 20-90% faster than the seeds planted with soil and Polyethylene Film. As such, the presence of biodegraded Chitosan Film and NP-Coated Chitosan Film pose much less or even no harm to plant growth and may instead enhance plant growth, thus possibly rendering such films applicable for multiple uses, such as for food packaging and preservation application.

Figure 7A:
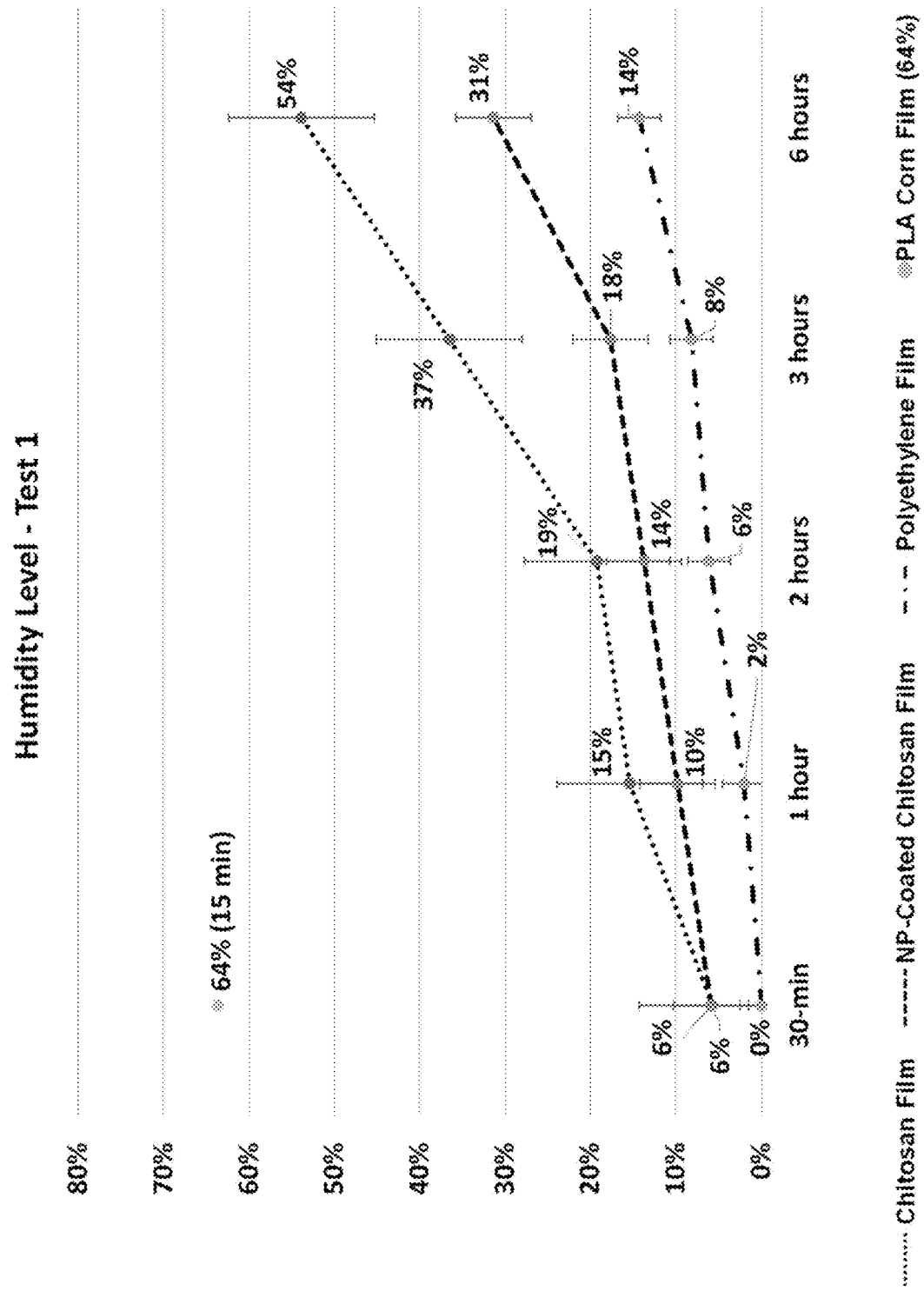
FIGS. 7A, 7B, and 7C are graphs illustrating water resistance between bioplastic films coated with hydrophobic nanoparticles and various plastic films.
Figure 7B:
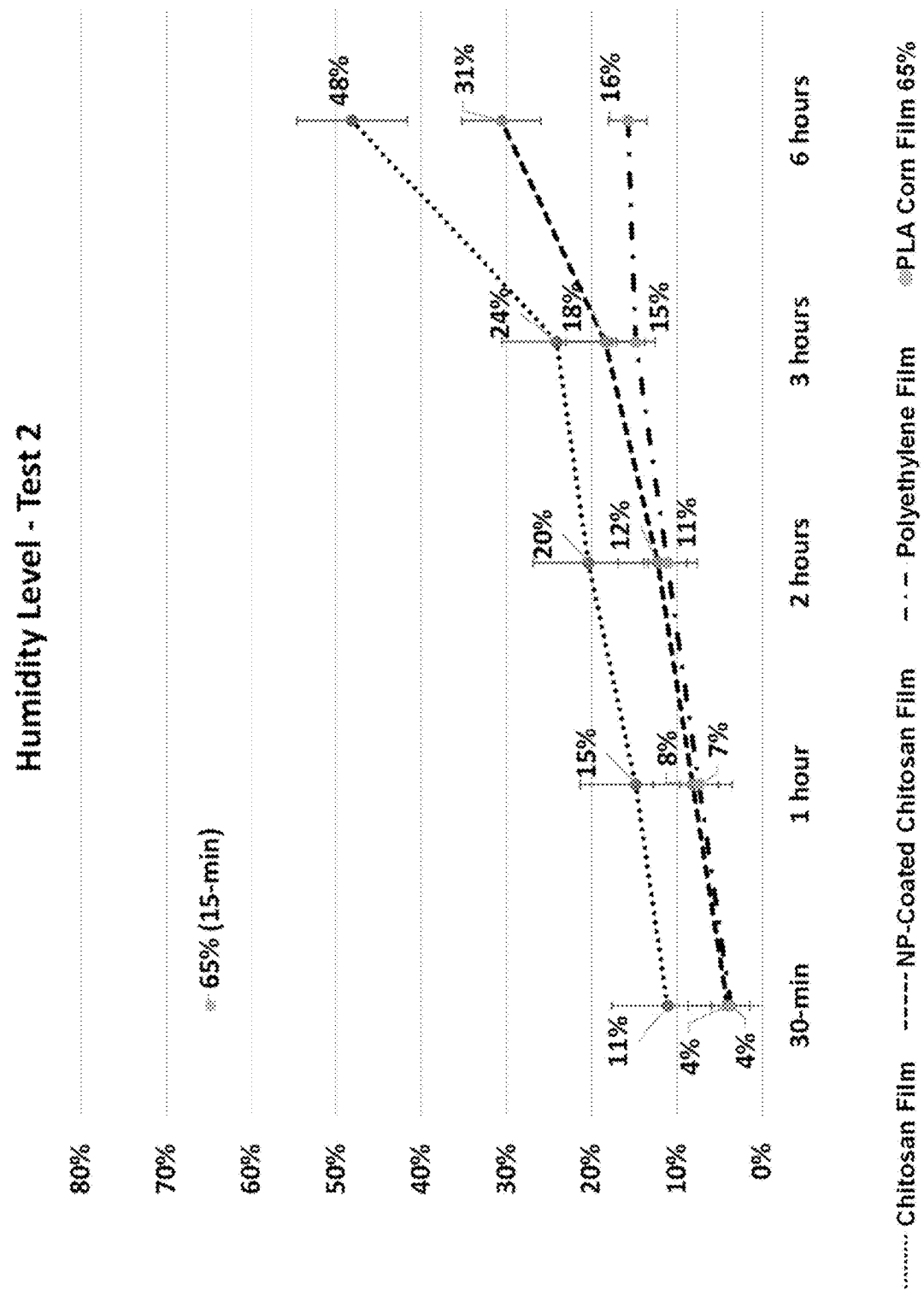
Figure 7C:
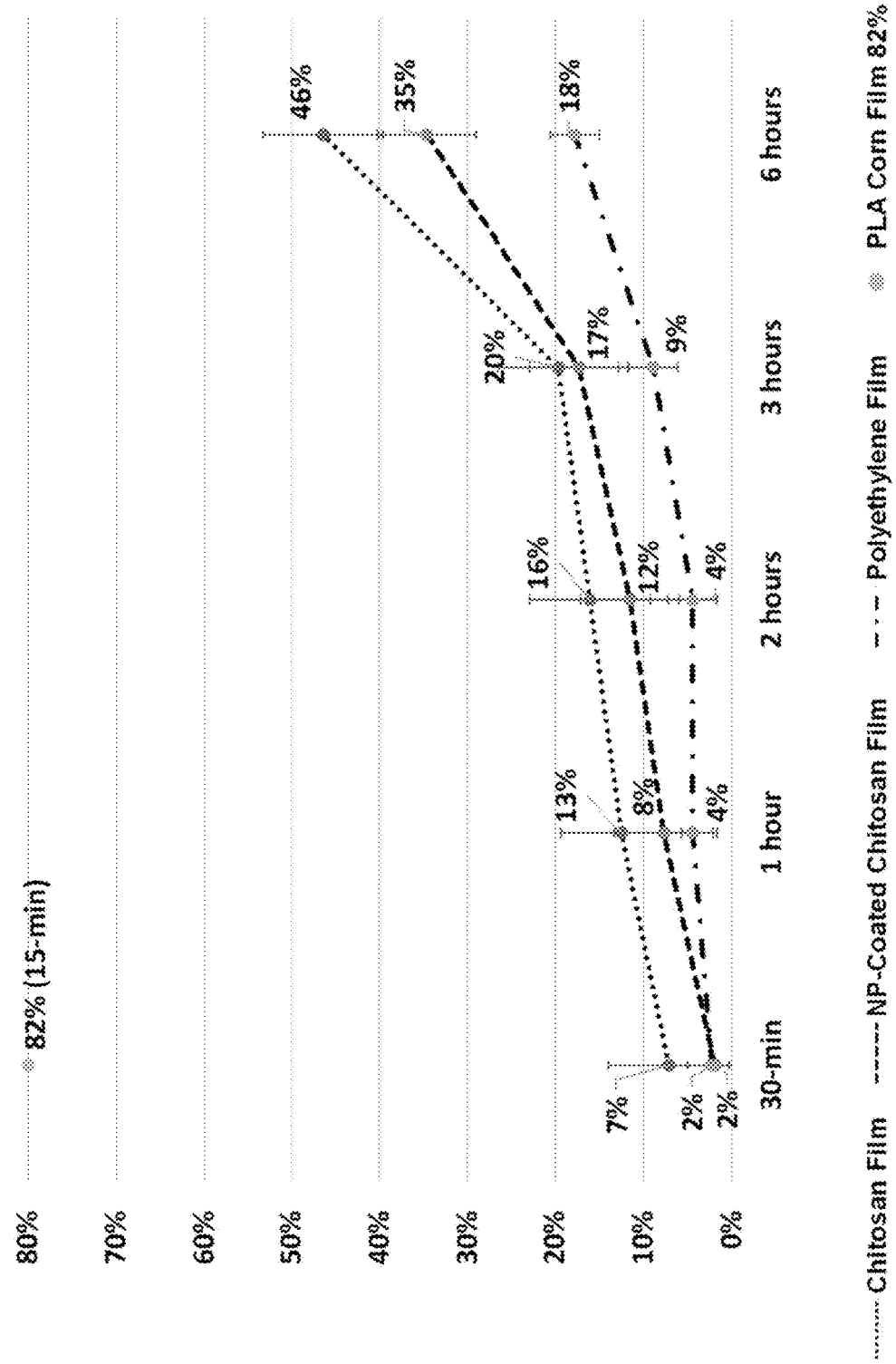

FIGS. 7A, 7B, and 7C are graphs illustrating water resistance between bioplastic films coated with hydrophobic nanoparticles and various plastic films. In some implementations, studies were performed to determine the water resistance of chitosan bioplastic film coated with hydrophobic nanoparticles (e.g., NP-Coated Chitosan Film) with respect to chitosan bioplastic film (e.g., Chitosan Film), another bioplastic film (e.g., PLA Corn Film), and the petroleum-based plastic film (e.g., Polyethylene Film).

In some implementations, water resistance of a film may be determined by performing tests, such as a water permeability and humidity test to compare the water resistance of an NP-Coated Chitosan Film with respect to a Chitosan Film, a PLA Corn Film, and a Polyethylene film. In some such implementations, the water permeability and humidity test may be performed by four glasses of water each covered with the four types of plastic film: the NP-Coated Chitosan Film, the Chitosan Film, the PLA Corn Film, and the Polyethylene Film. The extent of water resistance may be determined by the relative humidity (%) within each of the covered glasses of water and the time at which each film breaks after a prolonged period. In some such implementations, three water permeability and humidity tests were performed on the NP-Coated Chitosan Film, the Chitosan Film, the PLA Corn Film, and the Polyethylene Film. The temperature within each covered (with each plastic film) glass of water was measured for about 6 hours, with intervals at 30 minutes, 1 hour, 2 hours, 3, hours, and 6 hours. After the 6th hour, test results, in FIGS. 7A, 7B, and 7C, indicate that the NP-Coated Chitosan Films exhibit 31-35% of relative humidity increase over the 6 hours, compared to 46-54% of relative humidity increase for the Chitosan Films. Neither of the NP-Coated Chitosan Film or Chitosan Film broke in the $6^{th}$ hour. In the same implementations, the PLA Corn Film broke within 15 minutes of testing, with the relative humidity level rising to 64-82%, while Polyethylene Film provides the strongest water resistance, with less than 20% of relative humidity increase over the 6 hours. As such, the NP-Coated Chitosan Films may be exceptionally applicable for multiple uses, such as food packaging and preservation due to their water resistance properties.

Figure 8A:
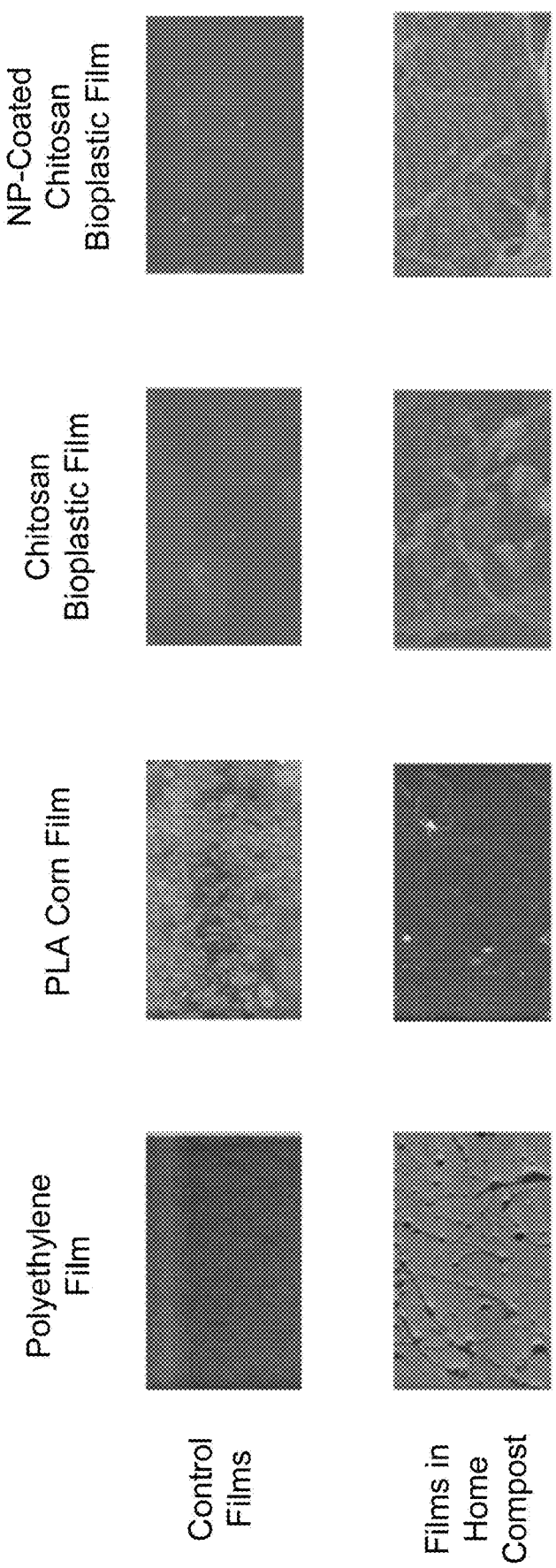
FIGS. 8A and 8B are diagrams illustrating biodegradability between bioplastic films coated with hydrophobic nanoparticles and various plastic films.
Figure 8B:
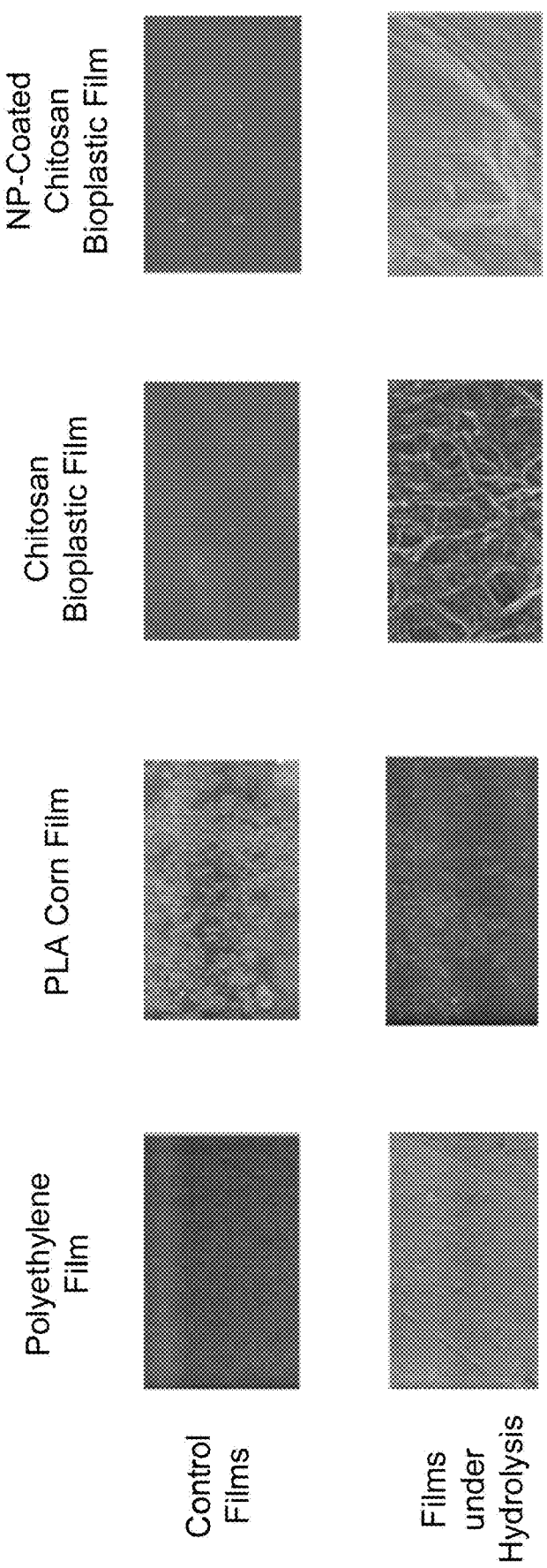

FIGS. 8A and 8B are diagrams of scanning electron microscope (SEM) analysis images illustrating biodegradability between bioplastic films coated with hydrophobic nanoparticles and various plastic films. In some implementations, studies were performed to determine the biodegradability of chitosan bioplastic film coated with hydrophobic nanoparticles (e.g., NP-Coated Chitosan Film) with respect to chitosan bioplastic film (e.g., Chitosan Film), another bioplastic film (e.g., PLA Corn Film), and the petroleum-based plastic film (e.g., Polyethylene Film).

In some implementations, biodegradability of a film may be determined by performing tests, such as a compost test and a hydrolysis test to compare the biodegradability of an NP-Coated Chitosan Film with respect to a Chitosan Film, a PLA Corn Film, and a Polyethylene Film. In some implementations, biodegradability of a film may be determined by the compost test in which a set of 4 total control films (NP-Coated Chitosan Film, Chitosan Film, PLA Corn Film, and Polyethylene Film) are provided as a baseline set of films in a room-temperature environment (e.g., 22-25° F.) while another set of 4 total films (NP-Coated Chitosan Film, Chitosan Film, PLA Corn Film, and Polyethylene Film) are set within a compost environment, such as buried in common home compost, for 14 days. After 14 days, each of the NP-Coated Chitosan Film, Chitosan Film, PLA Corn Film, and Polyethylene Film in the compost environment is analyzed for structural changes, which may be determined by, for example, a scanning electron microscope (SEM) at 1000×magnitude. Referring to FIG. 8A, both Chitosan Film and NP-Coated Chitosan Film show visible pores and filamentous microbe growths, while PLA Corn Film shows no visible signs of degradation and Polyethylene Film only indicates slight surface ruptures. As such, the biodegradability of NP-Coated Chitosan Film may render such film exceptionally environmental-friendly.

In some implementations, biodegradability of a film may be determined by performing the hydrolysis test in which a set of 4 total control films (NP-Coated Chitosan Film, Chitosan Film, PLA Corn Film, and Polyethylene Film) are provided as a baseline set of films in a room-temperature environment (e.g., 22-25° F.) while another set of 4 total films (NP-Coated Chitosan Film, Chitosan Film, PLA Corn Film, and Polyethylene Film) are fully submerged in water to induce hydrolysis, for 7 days. After 7 days, each of the submerged NP-Coated Chitosan Film, Chitosan Film, PLA Corn Film, and Polyethylene Film is analyzed for structural changes, which may be determined by, for example, a scanning electron microscope (SEM) at 1000×magnitude. Referring to FIG. 8B, both Chitosan Film and NP-Coated Chitosan Film show visible pores and breakage, while PLA Corn Film and Polyethylene Film show no visible signs of degradation. Accordingly, NP-Coated Chitosan Film may be exceptionally environmental-friendly based on its biodegradability.

FIGS. 9A, 9B, 9C, and 9D are diagrams illustrating food preservability between bioplastic films coated with hydrophobic nanoparticles and various plastic films. FIGS. 10A, 10B, 10C, and 10D are diagrams further illustrating food preservability between bioplastic films coated with hydrophobic nanoparticles and various plastic films. FIGS. 11A, 11B, and 11C are diagrams further illustrating food preservability between bioplastic films coated with hydrophobic nanoparticles and various plastic films.

In some implementations, studies were performed to determine the food preservability of chitosan bioplastic film coated with hydrophobic nanoparticles (e.g., NP-Coated Chitosan Film) with respect to another bioplastic film (e.g., PLA Corn Film), and the petroleum-based plastic film (e.g., Polyethylene Film). In some implementations, food preservability of a film may be determined by performing tests, such as antimicrobial and antifungal tests, to compare the food preservability of an NP-Coated Chitosan Film with respect to a PLA Corn Film, and a Polyethylene Film.

Figure 9B:
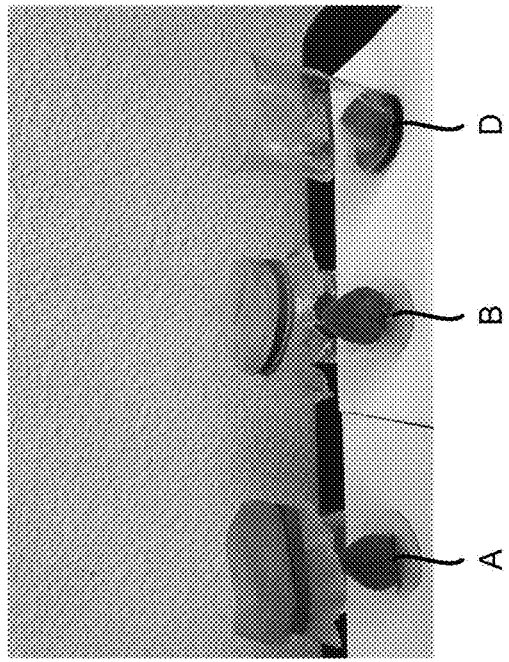
FIGS. 9A, 9B, 9C, and 9D are diagrams illustrating food preservability between bioplastic films coated with hydrophobic nanoparticles and various plastic films.
Figure 9D:
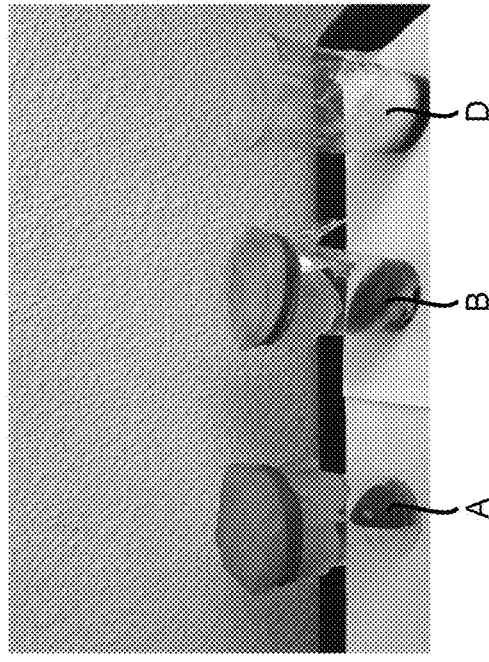
Figure 9A:
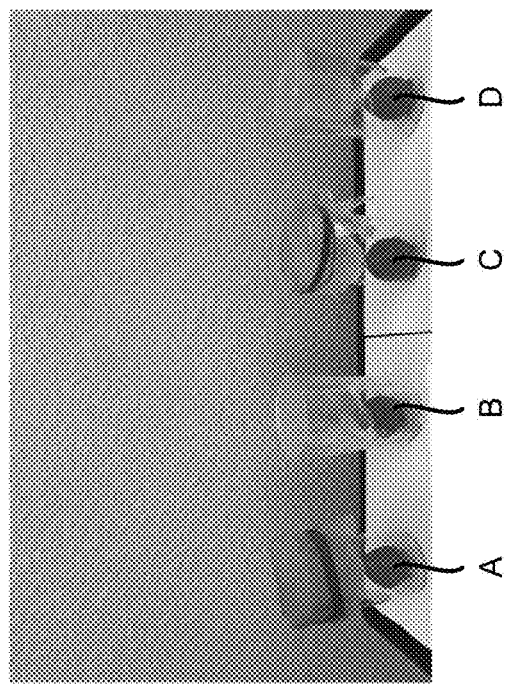
Figure 9C:
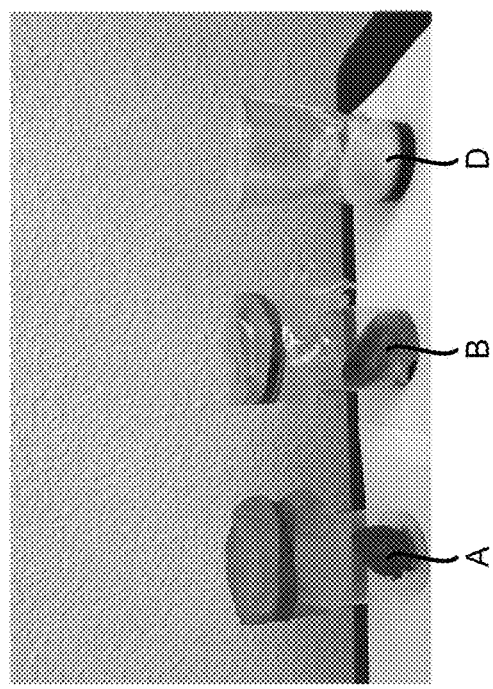

In some implementations, for example in FIGS. 9A-9D, the food preservability of a film may be determined by a performing antimicrobial and antifungal test in which a total of 4 films (NP-Coated Chitosan Film A, Starch Film B, PLA Corn Film C, and Polyethylene Film D) are each used to cover and seal a corresponding plastic cup with a strawberry placed therein for 10 days. The four film-covered strawberries were visually observed for 10 days. All strawberries showed no sign of mold on the first day as shown in FIG. 9A. The strawberry covered by the Polyethylene Film D broke out with white and black mold in the format of dots on the second day of the test, as shown in FIG. 9B. The strawberry covered by the Starch Film B broke out with black mold on the fifth day, as shown in FIG. 9C. The strawberry covered by the NP-Coated Chitosan Film A broke out with black mold on the ninth day, as shown in FIG. 9D. In some such implementations, the strawberry covered by the PLA Corn Film C was damaged before the second day of testing; thus, the corresponding results were removed from the experiments. In some such implementations, in FIGS. 9A-9D, the NP-Coated Chitosan Film preserved a strawberry approximately 4.5 times longer than the Polyethylene Film D and 2 times longer than the Starch Film B.

Figure 10A:
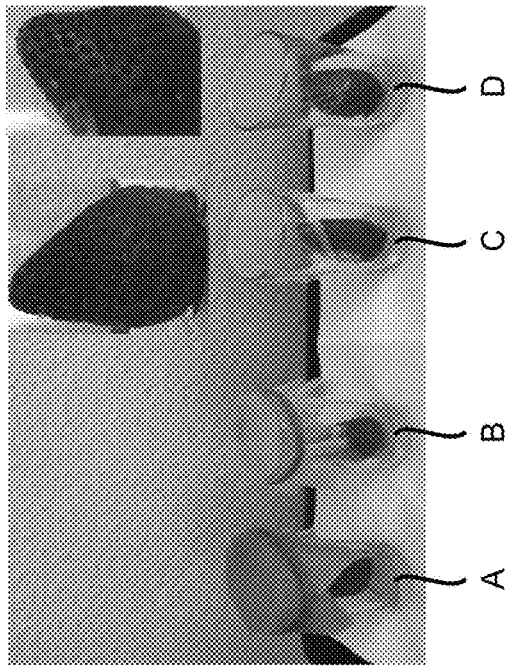
FIGS. 10A, 10B, 10C, and 10D are diagrams further illustrating food preservability between bioplastic films coated with hydrophobic nanoparticles and various plastic films.
Figure 10B:
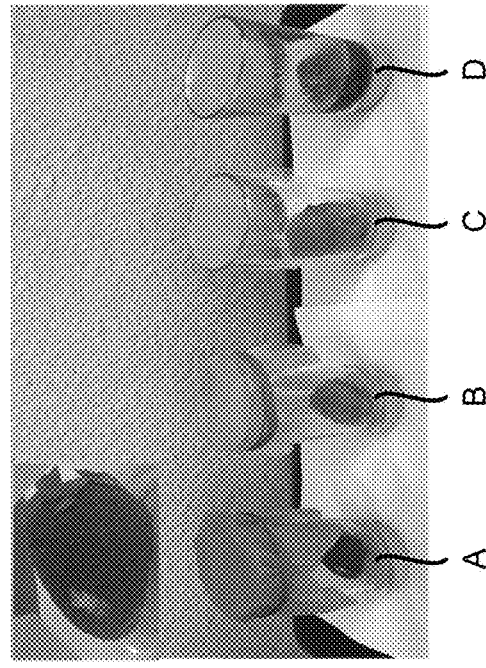
Figure 10C:
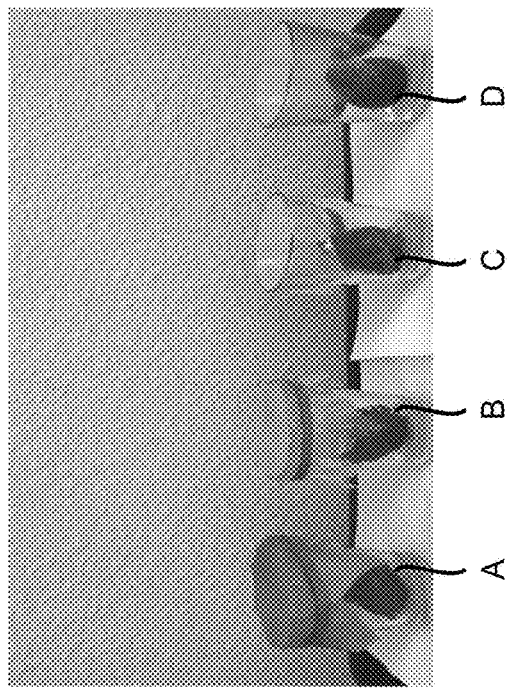
Figure 10D:
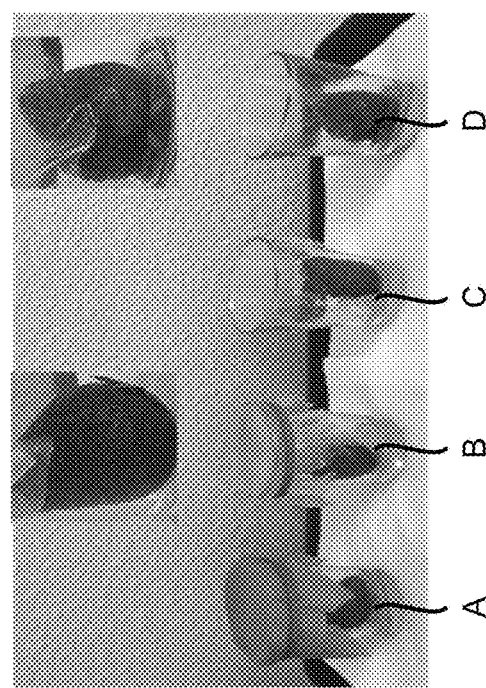
Figure 11A:
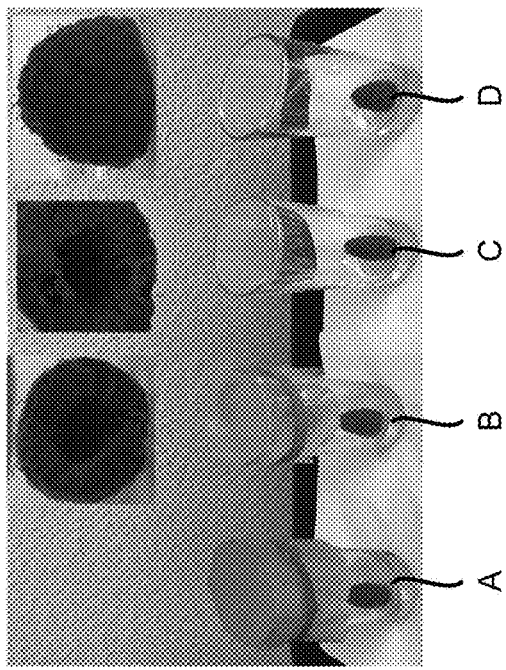
FIGS. 11A, 11B, and 11C are diagrams further illustrating food preservability between bioplastic films coated with hydrophobic nanoparticles and various plastic films.
Figure 11B:
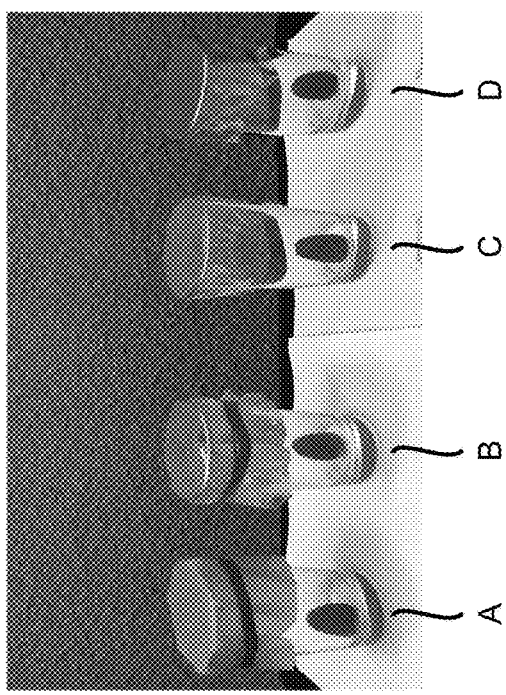
Figure 11C:
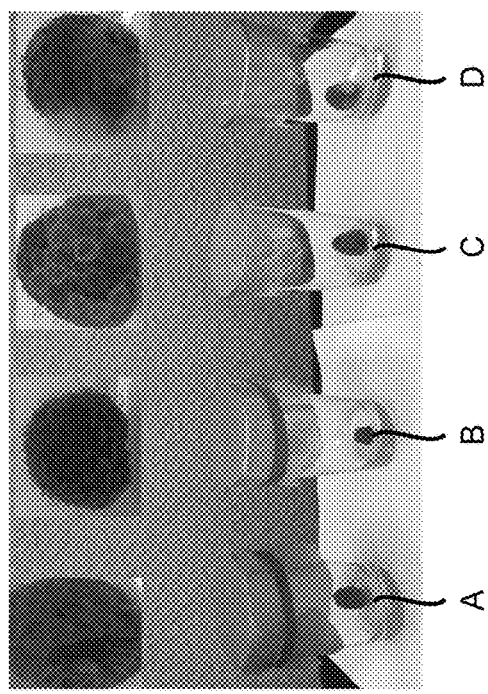

In some implementations, for example, in FIGS. 10A-10D, the food preservability of a film may be determined by performing antimicrobial and antifungal tests in which a total of 4 films (NP-Coated Chitosan Film A, Starch Film B, PLA Corn Film C, and Polyethylene Film D) are each used to cover and seal a glass cup with a strawberry placed therein for 10 days. The four film-covered strawberries were visually observed for 10 days. All strawberries showed no sign of mold on the first day, as shown in FIG. 10A. The strawberry covered by the Polyethylene Film D and the PLA Corn Film C broke out with white and black mold in the format of dots on the second day of the test, as shown in FIG. 10B. The strawberry covered by the Starch Film B broke out with black mold on the third day, while the strawberry covered by the Polyethylene Film D began to leak juices, as shown in FIG. 10C. The strawberry covered by the NP-Coated Chitosan Film A was kept fresh until breaking out with black mold on the tenth day, as shown in FIG. 10D. In some such implementations, in FIGS. 10A-10D, the NP-Coated Chitosan Film A preserved a strawberry approximately 5 times longer than the Polyethylene Film D and the PLA Corn Film C.

In some implementations, for example, in FIGS. 11A-11C, the food preservability of a film may be determined by performing antimicrobial and antifungal tests in which a total of 4 films (NP-Coated Chitosan Film A, Starch Film B, PLA Corn Film C, and Polyethylene Film D) are each used to cover a glass cup with another agricultural product, raspberry, placed in the glass cup for 10 days. The four film-covered strawberries were visually observed for 10 days. All strawberries showed no sign of mold on the first day, as shown in FIG. 11A. The raspberries covered by the Starch Film B, the Polyethylene Film D, and the PLA Corn Film C broke out with mold in the format of dots on the third day of the test, as shown in FIG. 11B. The strawberry covered by the NP-Coated Chitosan Film A was kept fresh until breaking out with white mold dot near a bottom portion of the raspberry on the eighth day, as shown in FIG. 11C. In some such implementations, in FIGS. 11A-11C, the NP-Coated Chitosan Film A preserved a strawberry approximately three times longer than the Starch Film B, the Polyethylene Film D, and the PLA Corn Film C. In view of all the food preservability testing performed above, the hydrophobic chitosan bioplastic films may prolong the product-life of perishable foods by up to 5 times compared to Polyethylene Film, thus making hydrophobic chitosan bioplastic films (e.g., NP-Coated Chitosan Films or Coated Films in the present disclosure) particularly applicable to the food preservation and packaging industry while being much more biodegradable, higher in food preservability, more water resistant, and less phytotoxic than the petroleum-based bioplastics, as well as other bioplastics such as PLA Corn Film.

From the present disclosure, it can be seen that various techniques may be used for implementing the concepts described in the present disclosure without departing from the scope of those concepts. While the concepts have been described with specific reference to certain implementations, a person of ordinary skill in the art may recognize that changes may be made in form and detail without departing from the scope of those concepts.

As such, the described implementations are to be considered in all respects as illustrative and not restrictive. It should also be understood that the present disclosure is not limited to the particular implementations described but rather many rearrangements, modifications, and substitutions are possible without departing from the scope of the present disclosure.

What is claimed is:

1. A method of manufacturing a hydrophobic bioplastic film for multiple-use, the method comprising:
    forming a bioplastic film comprising chitosan; and
    coating the bioplastic film with a plurality of hydrophobic nanoparticles, wherein
    coating the bioplastic film comprises:
        vertically submerging the bioplastic film into a nanoparticle dispersion comprising the plurality of hydrophobic nanoparticles,
        directing the plurality of hydrophobic nanoparticles of the nanoparticle dispersion toward the submerged bioplastic film, and
        removing the bioplastic film, coated with an aggregation of the plurality of hydrophobic nanoparticles, from the nanoparticle dispersion to form the hydrophobic bioplastic film,
    the nanoparticle dispersion comprises:
        mixing 100 micrograms of nanoparticle powder into isopropanol, and
        distributing the nanoparticle powder substantially evenly in the nanoparticle dispersion,
    the isopropanol and the nanoparticle powder are mixed at a ratio of 1 milliliter of the isopropanol to 100 micrograms of the nanoparticle powder,
    in mixing the nanoparticle dispersion, the nanoparticle dispersion is further mixed with a surfactant and acetone,
    the surfactant comprises at least sodium lauryl sulfate,
    the surfactant and the hydrophobic nanoparticles have a weight ratio of 80:20, and
    the acetone has a percentage by weight of 1 wt % of a total weight of the nanoparticle dispersion.

2. The method of claim 1, wherein forming the bioplastic film comprises:
    forming a polymer mixture by mixing a first amount of chitosan powder, a second amount of starch, and a third amount of water;
    heating the polymer mixture;
    introducing a fourth amount of glycerin and a fifth amount of acetic acid into the polymer mixture and further mixing the polymer mixture;
    removing the further mixed polymer mixture from heating;
    distributing the further mixed polymer mixture substantially evenly; and
    drying the substantially evenly distributed polymer mixture to form the bioplastic film.

3. The method of claim 2, wherein the first amount is from 12 to 14 grams, the second amount is from 12 to 14 grams, the third amount is from 180 to 200 milliliters, the fourth amount is 10 milliliters, and the fifth amount is 10 milliliters.

4. The method of claim 2, wherein the polymer mixture is heated at a temperature from 65 to 75° C., inclusive.

5. The method of claim 1, wherein in mixing the nanoparticle dispersion, the isopropanol and the nanoparticle powder are mixed for a continuous period of 20 minutes.

6. The method of claim 1, wherein:
    the nanoparticle powder comprises the plurality of hydrophobic nanoparticles;
    the plurality of hydrophobic nanoparticles comprises at least silicon dioxide particles; and
    the silicon dioxide particles have an average particle size of 10 nanometers to 20 nanometers, inclusive.

\* \* \* \* \*